(12) United States Patent
Stiller et al.

(10) Patent No.: US 10,941,042 B2
(45) Date of Patent: Mar. 9, 2021

(54) PROCESSES AND COMPOSITIONS FOR CARBON FOAMS AND MATERIALS

(71) Applicant: West Virginia University, Morgantown, WV (US)

(72) Inventors: Alfred Stiller, Morgantown, WV (US); Christopher Yurchick, Fairmont, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 15/947,520

(22) Filed: Apr. 6, 2018

(65) Prior Publication Data

US 2019/0308881 A1 Oct. 10, 2019

(51) Int. Cl.
*C01B 31/02* (2006.01)
*C01B 32/354* (2017.01)
*C01B 32/182* (2017.01)
*C01B 32/05* (2017.01)

(52) U.S. Cl.
CPC .......... *C01B 32/382* (2017.08); *C01B 32/05* (2017.08); *C01B 32/182* (2017.08)

(58) Field of Classification Search
CPC ............................. C01B 32/05; C01B 32/382
See application file for complete search history.

(56) References Cited

U.S. PATENT DOCUMENTS

| | | | |
|---|---|---|---|
| 3,256,101 A | 6/1966 | Arns | |
| 4,014,817 A | 3/1977 | Johnson et al. | |
| 4,921,831 A * | 5/1990 | Nakai | C01B 32/384 502/416 |
| 6,033,506 A | 3/2000 | Klett | |
| 6,656,239 B1 * | 12/2003 | Rogers | C04B 28/02 264/29.1 |
| 6,797,251 B1 | 9/2004 | Bennett et al. | |
| 7,767,183 B2 | 8/2010 | Matviya | |
| 8,226,816 B2 | 7/2012 | Kennel et al. | |
| 8,465,561 B2 | 6/2013 | Stiller et al. | |
| 2004/0177548 A1 | 9/2004 | Rogers | |
| 2006/0239889 A1 | 10/2006 | Lewis et al. | |
| 2009/0061312 A1 | 3/2009 | Zharmu et al. | |
| 2011/0028708 A1 | 2/2011 | White et al. | |
| 2012/0097519 A1 | 4/2012 | Stiller | |
| 2013/0004408 A1 | 1/2013 | Dua et al. | |

FOREIGN PATENT DOCUMENTS

WO WO2003067931 A1 8/2003

OTHER PUBLICATIONS

Shang et al, Preparing high surface area porous carbon from biomass by carbonization in a molten salt medium, RSC Advances 5.92:75728-75734, Abstarct, p. 4 para 2, 2015.
International Search Report for application PCT/US2019/026076, dated Jun. 20, 2019.
Toda et al., The influence of particle size distribution of coal on the fluidity of coal-water mixtures, Power Technology 55.4:214-245, p. 240 col. 1 para 1-2, 1988.
Yang et al., Carbon foam produced from fluid catalytic cracking slurry at atmospheric pressure, New Carbon Materials, vol. 23, No. 2, 2008.

* cited by examiner

*Primary Examiner* — Stuart L Hendrickson
(74) *Attorney, Agent, or Firm* — Innovators Legal

(57) ABSTRACT

In one aspect, the disclosure relates to processes for preparation of a carbon foam material, the process comprising heating in a microwave heating apparatus a mixture comprising a coal material and a flux agent. In other aspects, relates to processes for preparation of a carbon foam material, the process comprising heating in a microwave heating apparatus a mixture comprising a coal material, a foaming pitch material and a flux agent. In a further aspect, the mixture comprising a coal material, a foaming pitch material and a flux agent after heating in the microwave heating apparatus can form a pseudo-fluid material. In a still further aspect, the pseudo-fluid material can be arranged in mold, and then further heated to form a carbon foam. The disclosure, in further aspects, relates to processes further providing carbon materials such as carbon composite materials, graphite, graphite flakes, and graphene. In various aspects, the disclosure relates to the carbon foam and other materials prepared using the disclosed processes. This abstract is intended as a scanning tool for purposes of searching in the particular art and is not intended to be limiting of the present disclosure.

19 Claims, 13 Drawing Sheets

PROCESSES AND COMPOSITIONS FOR CARBON FOAMS AND MATERIALS

BACKGROUND

Foams are described as porous solids. Carbon foams have been produced for several years. There are currently three basic processes for making foams. In the first, NMP soluble extracts from coal are heated to near 500° C. at 500 psig and foams are produced. The process devolatizes the extracts, with the remainder forming cross-links to yield a firm solid. The expelled volatiles create bubbles in the molten liquid extract. The external pressure prevents their rapid escape, so they form bubbles within the molten extract. As the extract further crosslinks the volatiles escape and a porous solid is produced. In a second currently available process, carbon-based foams, can be produced via pyrolization of foamed organic materials, such as polyurethane foams, to a carbon char. The skeleton of the foamed organic material remains intact and a carbon foam is produced. Finally, there are currently available processes to produce carbon foams from pitches, such as coal tar pitch, that are blended with ground coal. The blended pitch and ground coal mixture is then heated to nearly 500° C. under about 500 psig. In this process, similar to the first described process above, the pitch devolatilized. As the pitch devolatilizes, it is believed that the volatiles form a flux that promotes devolatilization and crosslinking within the coal articles. The result is a good quality carbon foam produced at relatively mild conditions.

However, the foregoing currently available processes for preparation of a carbon foam are limited by cost and/or scalability. Both the first and third processes described above are only feasible at a significantly elevated pressures. This requirement severely limits the dimensional scalability of the process. The second process described above utilizes a relatively costly material input, a foamed organic material, versus the wide-spread availability of coal materials at relatively low cost. Accordingly, there is a need to develop alternative and more cost-effective processes for producing carbon foam derived from coal. That is, new processes are required which reduced the capital cost and operating cost associated with carbon foam production. The availability of a more cost-effective process for producing carbon foam from coal would create new market opportunities for production of value-added products utilizing carbon foam.

Thus, despite advances in research directed to carbon foam materials, there remains a scarcity of processes to preparation of carbon foam materials at low operating pressure and at reasonable cost. These needs and other needs are satisfied by the present disclosure.

SUMMARY

In accordance with the purpose(s) of the disclosure, as embodied and broadly described herein, the disclosure, in one aspect, relates to processes for preparation of a carbon foam material, the process comprising heating in a microwave heating apparatus a mixture comprising a coal material and a flux agent. In other aspects, relates to processes for preparation of a carbon foam material, the process comprising heating in a microwave heating apparatus a mixture comprising a coal material, a foaming pitch material and a flux agent. In a further aspect, the mixture comprising a coal material, a foaming pitch material and a flux agent after heating in the microwave heating apparatus can form a pseudo-fluid material. In a still further aspect, the pseudo-fluid material can be arranged in mold, and then further heated to form a carbon foam. The disclosure, in further aspects, relates to processes further providing carbon materials such as carbon composite materials, graphene, graphene oxide, graphite, and/or graphite flakes. In various aspects, the disclosure relates to the carbon foam and other materials prepared using the disclosed processes.

Disclosed are processes for producing a carbon foam material, the process comprising: a heating step comprising heating a coal material and flux agent mixture in a microwave heating apparatus to a temperature of about 250° C. to about 700° C. at a pressure of 0.5 atm to about 1.5 atm for about 1 minute to about 60 minutes in a non-oxidizing atmosphere, thereby forming a carbon foam material; wherein the coal material and flux agent mixture comprises, (a) a flux agent present in an amount of about 25 wt % to about 80 wt % based on the total weight of the coal material and flux agent mixture; and (b) a coal material present in an amount of about 20 wt % to about 75 wt % based on the total weight of the coal material and flux agent mixture; and wherein the flux agent is capable of absorbing microwave radiation; and wherein the coal material has a particle size range of between about 10 mesh and about 400 mesh.

Also disclosed are processes for producing a carbon foam material, the process comprising: a heating step comprising heating a coal material, foaming pitch material and flux agent mixture in a microwave heating apparatus to a temperature of about 250° C. to about 700° C. at a pressure of 0.5 atm to about 1.5 atm for about 1 minute to about 30 minutes in a non-oxidizing atmosphere, thereby forming a carbon foam material; wherein the coal material, foaming pitch material and flux agent mixture comprises, (a) a coal material present in an amount of about 50 wt % to about 90 wt % based on the weight of the coal material and foaming pitch; (b) a foaming pitch material present in an amount of about 10 wt % to about 50 wt % based on the weight of the coal material and foaming pitch; (c) a flux agent present in an amount of about 15 wt % to about 50 wt % based on the total weight of the coal material, foaming pitch material and flux agent mixture; and wherein the coal material has a particle size range of between about 10 mesh and about 400 mesh; wherein the foaming pitch material has a particle size range of between about 10 mesh and about 100 mesh; and wherein the flux agent is capable of absorbing microwave radiation.

In various aspects, the disclosed processes can be used to prepare a carbon foam material and a secondary carbon material, such as a graphene, a graphene oxide, a graphite, a sp2-hydrized carbon material, and/or carbon foam composite materials.

Also disclosed are carbon foam materials prepared by the disclosed processes.

Also disclosed are carbon foam composite materials prepared by the disclosed processes.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the disclosure.

Figure 1:
FIG. 1 shows a representative image of a disclosed 80-100 mesh particle size carbon foam prepared from low volatile bituminous coal feedstock using a disclosed method as described in Example 1.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

The disclosures herein will be described more fully hereinafter with reference to the accompanying drawings, in which some, but not all possible embodiments are shown. Indeed, disclosures may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Prior to describing the various embodiments, the following definitions are provided and should be used unless otherwise indicated.

A. DEFINITIONS

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, nomenclature for compounds, including organic compounds, can be given using common names, IUPAC, IUBMB, or CAS recommendations for nomenclature.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance can or can not occur, and that the description includes instances where said event or circumstance occurs and instances where it does not.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

B. PROCESSES FOR FORMING CARBON FOAMS

In accordance with the purpose(s) of the disclosure, as embodied and broadly described herein, the disclosure, in one aspect, relates to processes for preparation of a carbon foam material, the process comprising heating in a microwave heating apparatus a mixture comprising a coal material and a flux agent. In other aspects, relates to processes for preparation of a carbon foam material, the process comprising heating in a microwave heating apparatus a mixture comprising a coal material, a foaming pitch material and a flux agent. In a further aspect, the mixture comprising a coal material, a foaming pitch material and a flux agent after heating in the microwave heating apparatus can form a pseudo-fluid material. In a still further aspect, the pseudo-fluid material can be arranged in mold, and then further heated to form a carbon foam. The disclosure, in further aspects, relates to processes further providing carbon materials such as carbon composite materials, graphene, graphene oxide, graphite, and/or graphite flakes. In various aspects, the disclosure relates to the carbon foam and other materials prepared using the disclosed processes.

Disclosed are processes for producing a carbon foam material, the process comprising: a heating step comprising heating a coal material and flux agent mixture in a microwave heating apparatus to a temperature of about 250° C. to about 700° C. at a pressure of 0.5 atm to about 1.5 atm for about 1 minute to about 60 minutes in a non-oxidizing atmosphere, thereby forming a carbon foam material; wherein the coal material and flux agent mixture comprises, (a) a flux agent present in an amount of about 25 wt % to about 80 wt % based on the total weight of the coal material and flux agent mixture; and (b) a coal material present in an amount of about 20 wt % to about 75 wt % based on the total weight of the coal material and flux agent mixture; and wherein the flux agent is capable of absorbing microwave radiation; and wherein the coal material has a particle size range of between about 10 mesh and about 400 mesh.

In various aspects, the heating step comprises heating the coal material and flux agent mixture at a pressure temperature, for a disclosed period of time, and at a temperature of about 300° C. to about 700° C.; about 500° C. to about 700° C.; about 500° C. to about 650° C.; about 550° C. to about 600° C.; about 550° C. to about 650° C.; about 400° C. to about 700° C.; about 400° C. to about 650° C.; about 400° C. to about 600° C.; about 450° C. to about 700° C.; about 450° C. to about 650° C.; about 450° C. to about 600° C.; a temperature or set of temperatures within any of the foregoing ranges of temperature; or an range of temperatures that is a sub-range of the foregoing ranges of temperature.

In various aspects, the heating step comprises heating the coal material and flux agent mixture at a disclosed temperature, for a disclosed period of time, and at a pressure of about 0.5 atm to about 1.5 atm; about 0.8 atm to about 1.5 atm; about 0.9 atm to about 1.5 atm; about 1.0 atm to about 1.5 atm; about 0.5 atm to about 1.2 atm; about 0.6 atm to about 1.2 atm; about 0.7 atm to about 1.2 atm; about 0.8 atm to about 1.2 atm; about 0.9 atm to about 1.2 atm; about 1.0 atm to about 1.2 atm; about 0.6 atm to about 1.2 atm; about 0.5 atm to about 1.1 atm; about 0.6 atm to about 1.1 atm; about 0.7 atm to about 1.1 atm; about 0.8 atm to about 1.1 atm; about 0.9 atm to about 1.1 atm; about 0.5 atm to about 1.0 atm; about 0.8 atm to about 1.0 atm; about 0.95 atm to about 1.0 atm; 0.90 atm to 0.95 atm; a pressure or set of pressures within any of the foregoing ranges of pressure; or an range of pressures that is a sub-range of the foregoing ranges of pressure.

In a further aspect, the heating step comprises heating the coal material and flux agent mixture at a disclosed temperature, a disclosed pressure, and a period of time of about 1 minute to about 2 minutes; about 1 minute to about 3 minutes; about 1 minute to about 4 minutes; about 1 minute to about 5 minutes; about 1 minute to about 10 minutes; about 1 minute to about 15 minutes; about 1 minute to about 20 minutes; about 1 minute to about 25 minutes; about 1 minute to about 30 minutes; about 2 minutes to about 5 minutes; about 2 minutes to about 10 minutes; about 2 minutes to about 15 minutes; about 2 minutes to about 20 minutes; about 2 minutes to about 25 minutes; about 2 minutes to about 30 minutes; about 3 minutes to about 5 minutes; about 3 minutes to about 10 minutes; about 3 minutes to about 15 minutes; about 3 minutes to about 20 minutes; about 3 minutes to about 25 minutes; about 3 minutes to about 30 minutes; about 4 minutes to about 5 minutes; about 4 minutes to about 10 minutes; about 4 minutes to about 15 minutes; about 4 minutes to about 20 minutes; about 4 minutes to about 25 minutes; about 4 minutes to about 30 minutes; about 5 minutes to about 10 minutes; about 5 minutes to about 15 minutes; about 5 minutes to about 20 minutes; about 5 minutes to about 25 minutes; about 5 minutes to about 30 minutes; a period of time or set of time periods within any of the foregoing ranges of time; or an range of time that is a sub-range of the foregoing ranges of time.

In various aspects, the coal material and flux agent mixture comprises a flux agent present in an amount of about 25 wt % to about 80 wt % based on the total weight of the coal material and flux agent mixture. In a further aspect, the flux agent is present in an amount, based on the total weight of the coal material and flux agent mixture, of about 25 wt %; about 30 wt %; about 35 wt %; about 40 wt %; about 45 wt %; about 50 wt %; about 55 wt %; about 60 wt %; about 65 wt %; about 70 wt %; about 75 wt %; about 80 wt %; any set or combination of the foregoing values; or any range utilizing the foregoing values to define a sub-range within about 25 wt % to about 80 wt %.

In various aspects, the coal material and flux agent mixture comprises a coal material present in an amount of about 20 wt % to about 75 wt % based on the total weight of the coal material and flux agent mixture. In a further aspect, the coal material is present in an amount, based on the total weight of the coal material and flux agent mixture, of about 20 wt %; about 25 wt %; about 30 wt %; about 35 wt %; about 40 wt %; about 45 wt %; about 50 wt %; about 55 wt %; about 60 wt %; about 65 wt %; about 70 wt %; about 75 wt %; any set or combination of the foregoing values; or any range utilizing the foregoing values to define a sub-range within about 20 wt % to about 75 wt %.

In various aspects, the coal material and flux agent mixture comprises a coal material having a particle size range of between about 10 mesh and about 400 mesh. In a further aspect, the coal material has a particle size of about 10 mesh; about 15 mesh; about 20 mesh; about 25 mesh; about 30 mesh; about 35 mesh; about 40 mesh; about 45 mesh; about 50 mesh; about 55 mesh; about 60 mesh; about 65 mesh; about 70 mesh; about 75 mesh; about 80 mesh; about 85 mesh; about 90 mesh; about 95 mesh; about 100 mesh; about 105 mesh; about 110 mesh; about 115 mesh; about 120 mesh; about 125 mesh; about 130 mesh; about 135 mesh; about 140 mesh; about 145 mesh; about 150 mesh; about 155 mesh; about 160 mesh; about 165 mesh; about 170 mesh; about 175 mesh; about 180 mesh; about 185 mesh; about 190 mesh; about 195 mesh; about 200 mesh; about 205 mesh; about 210 mesh; about 215 mesh; about 220 mesh; about 225 mesh; about 230 mesh; about 235 mesh; about 240 mesh; about 245 mesh; about 250 mesh; about 255 mesh; about 260 mesh; about 265 mesh; about 270 mesh; about 275 mesh; about 280 mesh; about 285 mesh; about 290 mesh; about 295 mesh; about 300 mesh; about 305 mesh; about 310 mesh; about 315 mesh; about 320 mesh; about 325 mesh; about 330 mesh; about 335 mesh; about 340 mesh; about 345 mesh; about 350 mesh; about 355 mesh; about 360 mesh; about 365 mesh; about 370 mesh; about 375 mesh; about 380 mesh; about 385 mesh; about 390 mesh; about 395 mesh; about 400 mesh; any set or combination of the foregoing values; or any range utilizing the foregoing values to define a sub-range within about 10 mesh to about 400 mesh.

Also disclosed are processes for producing a carbon foam material, the process comprising: a heating step comprising heating a coal material, foaming pitch material and flux agent mixture in a microwave heating apparatus to a temperature of about 250° C. to about 700° C. at a pressure of 0.5 atm to about 1.5 atm for about 1 minute to about 60 minutes in a non-oxidizing atmosphere, thereby forming a carbon foam material; wherein the coal material, foaming pitch material and flux agent mixture comprises, (a) a coal material present in an amount of about 50 wt % to about 90 wt % based on the weight of the coal material and foaming pitch; (b) a foaming pitch material present in an amount of about 10 wt % to about 50 wt % based on the weight of the coal material and foaming pitch; (c) a flux agent present in an amount of about 15 wt % to about 50 wt % based on the total weight of the coal material, foaming pitch material and flux agent mixture; and wherein the coal material has a particle size range of between about 10 mesh and about 400 mesh; wherein the foaming pitch material has a particle size range of between about 10 mesh and about 100 mesh; and wherein the flux agent is capable of absorbing microwave radiation.

In various aspects, the heating step comprises heating the coal material, foaming pitch material, and flux agent mixture at a pressure temperature, for a disclosed period of time, and at a temperature of about 300° C. to about 700° C.; about 500° C. to about 700° C.; about 500° C. to about 650° C.; about 550° C. to about 600° C.; about 550° C. to about 650° C.; about 400° C. to about 700° C.; about 400° C. to about 650° C.; about 400° C. to about 600° C.; about 450° C. to about 700° C.; about 450° C. to about 650° C.; about 450° C. to about 600° C.; a temperature or set of temperatures within any of the foregoing ranges of temperature; or an range of temperatures that is a sub-range of the foregoing ranges of temperature.

In various aspects, the heating step comprises heating the coal material, foaming pitch material, and flux agent mixture at a disclosed temperature, for a disclosed period of time, and at a pressure of about 0.5 atm to about 1.5 atm; about 0.8 atm to about 1.5 atm; about 0.9 atm to about 1.5 atm; about 1.0 atm to about 1.5 atm; about 0.5 atm to about 1.2 atm; about 0.6 atm to about 1.2 atm; about 0.7 atm to about 1.2 atm; about 0.8 atm to about 1.2 atm; about 0.9 atm to about 1.2 atm; about 1.0 atm to about 1.2 atm; about 0.6 atm to about 1.2 atm; about 0.5 atm to about 1.1 atm; about 0.6 atm to about 1.1 atm; about 0.7 atm to about 1.1 atm; about 0.8 atm to about 1.1 atm; about 0.9 atm to about 1.1 atm; about 0.5 atm to about 1.0 atm; about 0.8 atm to about 1.0 atm; about 0.95 atm to about 1.0 atm; 0.90 atm to 0.95 atm; a pressure or set of pressures within any of the foregoing ranges of pressure; or an range of pressures that is a sub-range of the foregoing ranges of pressure.

In a further aspect, the heating step comprises heating the coal material, foaming pitch material, and flux agent mixture at a disclosed temperature, a disclosed pressure, and a period of time of about 1 minute to about 2 minutes; about 1 minute to about 3 minutes; about 1 minute to about 4 minutes; about 1 minute to about 5 minutes; about 1 minute to about 10 minutes; about 1 minute to about 15 minutes; about 1 minute to about 20 minutes; about 1 minute to about 25 minutes; about 1 minute to about 30 minutes; about 2 minutes to about 5 minutes; about 2 minutes to about 10 minutes; about 2 minutes to about 15 minutes; about 2 minutes to about 20 minutes; about 2 minutes to about 25 minutes; about 2 minutes to about 30 minutes; about 3 minutes to about 5 minutes; about 3 minutes to about 10 minutes; about 3 minutes to about 15 minutes; about 3 minutes to about 20 minutes; about 3 minutes to about 25 minutes; about 3 minutes to about 30 minutes; about 4 minutes to about 5 minutes; about 4 minutes to about 10 minutes; about 4 minutes to about 15 minutes; about 4 minutes to about 20 minutes; about 4 minutes to about 25 minutes; about 4 minutes to about 30 minutes; about 5 minutes to about 10 minutes; about 5 minutes to about 15 minutes; about 5 minutes to about 20 minutes; about 5 minutes to about 25 minutes; about 5 minutes to about 30 minutes; a period of time or set of time periods within any of the foregoing ranges of time; or an range of time that is a sub-range of the foregoing ranges of time.

In various aspects, the coal material, foaming pitch material and flux agent mixture comprises a coal material present in an amount of about 50 wt % to about 90 wt % based on the total weight of the coal material and flux agent mixture. In a further aspect, the coal material is present in an amount, based on the total weight of the coal material and flux agent mixture, of about 50 wt %; about 55 wt %; about 60 wt %; about 65 wt %; about 70 wt %; about 75 wt %; about 80 wt %; about 85 wt %; about 90 wt %; any set or combination of the foregoing values; or any range utilizing the foregoing values to define a sub-range within about 50 wt % to about 90 wt %.

In various aspects, the coal material, foaming pitch material and flux agent mixture comprises a foaming pitch present in an amount of about 10 wt % to about 50 wt % based on the total weight of the coal material and flux agent mixture. In a further aspect, the foaming pitch is present in an amount, based on the total weight of the coal material and flux agent mixture, of about 10 wt %; about 15 wt %; about 20 wt %; about 25 wt %; about 30 wt %; about 35 wt %; about 40 wt %; about 45 wt %; about 50 wt %; any set or combination of the foregoing values; or any range utilizing the foregoing values to define a sub-range within about 10 wt % to about 50 wt %.

In various aspects, the coal material, foaming pitch material and flux agent mixture comprises a flux agent present in an amount of about 15 wt % to about 50 wt % based on the total weight of the coal material and flux agent mixture. In a further aspect, the flux agent is present in an amount, based on the total weight of the coal material and flux agent mixture, of about 15 wt %; about 20 wt %; about 25 wt %; about 30 wt %; about 35 wt %; about 40 wt %; about 45 wt %; about 50 wt %; any set or combination of the foregoing values; or any range utilizing the foregoing values to define a sub-range within about 15 wt % to about 50 wt %.

In various aspects, the coal material, foaming pitch material and flux agent mixture comprises a coal material having a particle size range of about 10 mesh to about 400 mesh; about 10 mesh to about 200 mesh; about 10 mesh to about 100 mesh; about 20 mesh to about 400 mesh; about 20 mesh to about 200 mesh; about 20 mesh to about 100 mesh; about 50 mesh to about 400 mesh; about 50 mesh to about 200 mesh; about 50 mesh to about 100 mesh; and combinations thereof.

In a further aspect, the coal material is a homogeneous mixture of a first coal material having a particle size of about 10 mesh to about 400 mesh; about 10 mesh to about 200 mesh; about 10 mesh to about 100 mesh; about 20 mesh to about 400 mesh; about 20 mesh to about 200 mesh; about 20 mesh to about 100 mesh; about 50 mesh to about 400 mesh; about 50 mesh to about 200 mesh; about 50 mesh to about 100 mesh; and a second coal material having a particle size of about 10 mesh to about 400 mesh; about 10 mesh to about 200 mesh; about 10 mesh to about 100 mesh; about 20 mesh to about 400 mesh; about 20 mesh to about 200 mesh; about 20 mesh to about 100 mesh; about 50 mesh to about 400 mesh; about 50 mesh to about 200 mesh; about 50 mesh to about 100 mesh; provided that the first coal material and the second coal material have different particle size ranges. In a still further aspect, the first coal material is present in an amount of about 10 wt % to about 90 wt % and the second coal material is present in an amount of about 90 wt % to about 10 wt %, or a sub-range within the foregoing ranges.

In a further aspect, the coal material has a particle size of about 10 mesh; about 15 mesh; about 20 mesh; about 25 mesh; about 30 mesh; about 35 mesh; about 40 mesh; about 45 mesh; about 50 mesh; about 55 mesh; about 60 mesh; about 65 mesh; about 70 mesh; about 75 mesh; about 80 mesh; about 85 mesh; about 90 mesh; about 95 mesh; about 100 mesh; about 105 mesh; about 110 mesh; about 115 mesh; about 120 mesh; about 125 mesh; about 130 mesh; about 135 mesh; about 140 mesh; about 145 mesh; about 150 mesh; about 155 mesh; about 160 mesh; about 165 mesh; about 170 mesh; about 175 mesh; about 180 mesh; about 185 mesh; about 190 mesh; about 195 mesh; about 200 mesh; about 205 mesh; about 210 mesh; about 215 mesh; about 220 mesh; about 225 mesh; about 230 mesh; about 235 mesh; about 240 mesh; about 245 mesh; about 250 mesh; about 255 mesh; about 260 mesh; about 265 mesh; about 270 mesh; about 275 mesh; about 280 mesh; about 285 mesh; about 290 mesh; about 295 mesh; about 300 mesh; about 305 mesh; about 310 mesh; about 315 mesh; about 320 mesh; about 325 mesh; about 330 mesh; about 335 mesh; about 340 mesh; about 345 mesh; about 350 mesh; about 355 mesh; about 360 mesh; about 365 mesh; about 370 mesh; about 375 mesh; about 380 mesh; about 385 mesh; about 390 mesh; about 395 mesh; about 400 mesh; any set or combination of the foregoing values; or any range utilizing the foregoing values to define a sub-range within about 20 mesh to about 300 mesh.

In various aspects, the non-oxidizing atmosphere in the heating step can comprise oxygen present in an amount less than or equal to about 10% (v/v); about 9% (v/v); about 8% (v/v); about 7% (v/v); about 6% (v/v); about 5% (v/v); about 4% (v/v); about 3% (v/v); about 2.5% (v/v); about 2% (v/v); about 1.5% (v/v); about 1% (v/v); about 0.5% (v/v); a percentage (v/v) of oxygen value or set of percentage of oxygen values within any of the foregoing ranges of percentage of oxygen values; or a range of percentage of oxygen values that is a sub-range of the foregoing ranges of percentage of oxygen values. In a further aspect, the non-oxidizing atmosphere is essentially oxygen free.

In various aspects, the non-oxidizing atmosphere in the heating step comprises one or more inert gases; and wherein the inert gas is argon, nitrogen, or a mixture of both in an amount that is greater than about 70% (v/v). In a further aspect, the amount of inert gas in the non-oxidizing atmosphere comprises greater than about 75% (v/v); about 80% (v/v); about 85% (v/v); about 90% (v/v); about 95% (v/v); about 96% (v/v); about 97% (v/v); about 98% (v/v); about 99% (v/v); a percentage (v/v) value of inert gas or set of percentage (v/v) of values of inert gas within any of the foregoing ranges of inert gas values; or a range of percentage of inert gas values that is a sub-range of the foregoing ranges of percentage of inert gas values.

In various aspects, the process can further comprise calcining the carbon foam material at a temperature of about 800° C. to about 1200° C. for about 0.5 hours to about 12 hours in a non-oxidizing atmosphere. In a further aspect, the calcining can be carried out for a disclosed period of time at a temperature of about 800° C. to about 1200° C.; about 800° C. to about 1100° C.; about 800° C. to about 1000° C.; about 900° C. to about 1200° C.; about 900° C. to about 1100° C.; about 900° C. to about 1000° C.; about 950° C. to about 1200° C.; about 950° C. to about 1100° C.; about 950° C. to about 1100° C.; a temperature or set of temperatures within any of the foregoing ranges of temperature; or an range of temperatures that is a sub-range of the foregoing ranges of temperature. In a still further aspect, the calcining can be carried out at a disclosed temperature for a period of time of about 1 hours to about 12 hours; about 2 hours to about 12 hours; about 3 hours to about 12 hours; about 4 hours to about 12 hours; about 5 hours to about 12 hours; about 6 hours to about 12 hours; about 0.5 hours to about 10 hours; about 1 hours to about 10 hours; about 2 hours to about 10 hours; about 3 hours to about 10 hours; about 4 hours to about 10 hours; about 5 hours to about 10 hours; about 6 hours to about 10 hours; about 0.5 hours to about 8 hours; about 1 hours to about 8 hours; about 2 hours to about 8 hours; about 3 hours to about 8 hours; about 4 hours to about 8 hours; about 5 hours to about 8 hours; about 6 hours to about 8 hours; a period of time or set of time periods within any of the foregoing ranges of time; or an range of time that is a sub-range of the foregoing ranges of time.

In various aspects, the non-oxidizing atmosphere used in the calcining step can comprise oxygen present in an amount less than or equal to about 10% (v/v); about 9 (v/v); about 8% (v/v); about 7% (v/v); about 6% (v/v); about 5% (v/v); about 4% (v/v); about 3% (v/v); about 2.5% (v/v); about 2% (v/v); about 1.5% (v/v); about 1% (v/v); about 0.5% (v/v); a percentage (v/v) of oxygen value or set of percentage of oxygen values within any of the foregoing ranges of percentage of oxygen values; or a range of percentage of oxygen values that is a sub-range of the foregoing ranges of percentage of oxygen values. In a further aspect, the non-oxidizing atmosphere in the calcining step is essentially oxygen free.

In various aspects, the non-oxidizing atmosphere used in the calcining step can comprise one or more inert gases; and wherein the inert gas is argon, nitrogen, or a mixture of both in an amount that is greater than about 70% (v/v). In a further aspect, the amount of inert gas in the non-oxidizing atmosphere comprises greater than about 75% (v/v); about 80% (v/v); about 85% (v/v); about 90% (v/v); about 95% (v/v); about 96% (v/v); about 97% (v/v); about 98% (v/v); about 99% (v/v); a percentage (v/v) value of inert gas or set of percentage (v/v) of values of inert gas within any of the foregoing ranges of inert gas values; or a range of percentage of inert gas values that is a sub-range of the foregoing ranges of percentage of inert gas values.

In various aspects, the process can further comprise the steps of preparing a foam pitch material. For example, the processes described herein below for preparation of a foam material, or alternatively, pitch production processes described in U.S. Pat. No. 8,226,816 and U.S. patent application Ser. Nos. 13/166,229 and 14/513,745, each of which is incorporated by reference in their entirety. In a further aspect, a foaming pitch material can be prepared from coal derived mesophase pitch produced using a coal conversion process described in U.S. Pat. No. 8,226,816 and U.S. patent application Ser. Nos. 13/166,229 and 14/513,745.

In various aspects, the disclosed processes can be used to prepare a carbon foam material and a secondary carbon material, such as a graphene, a graphene oxide, a graphite, a sp2-hydrized carbon material, and/or carbon foam composite materials.

Also disclosed are carbon foam materials prepared by the disclosed processes.

Also disclosed are carbon foam composite materials prepared by the disclosed processes.

Figure 15:
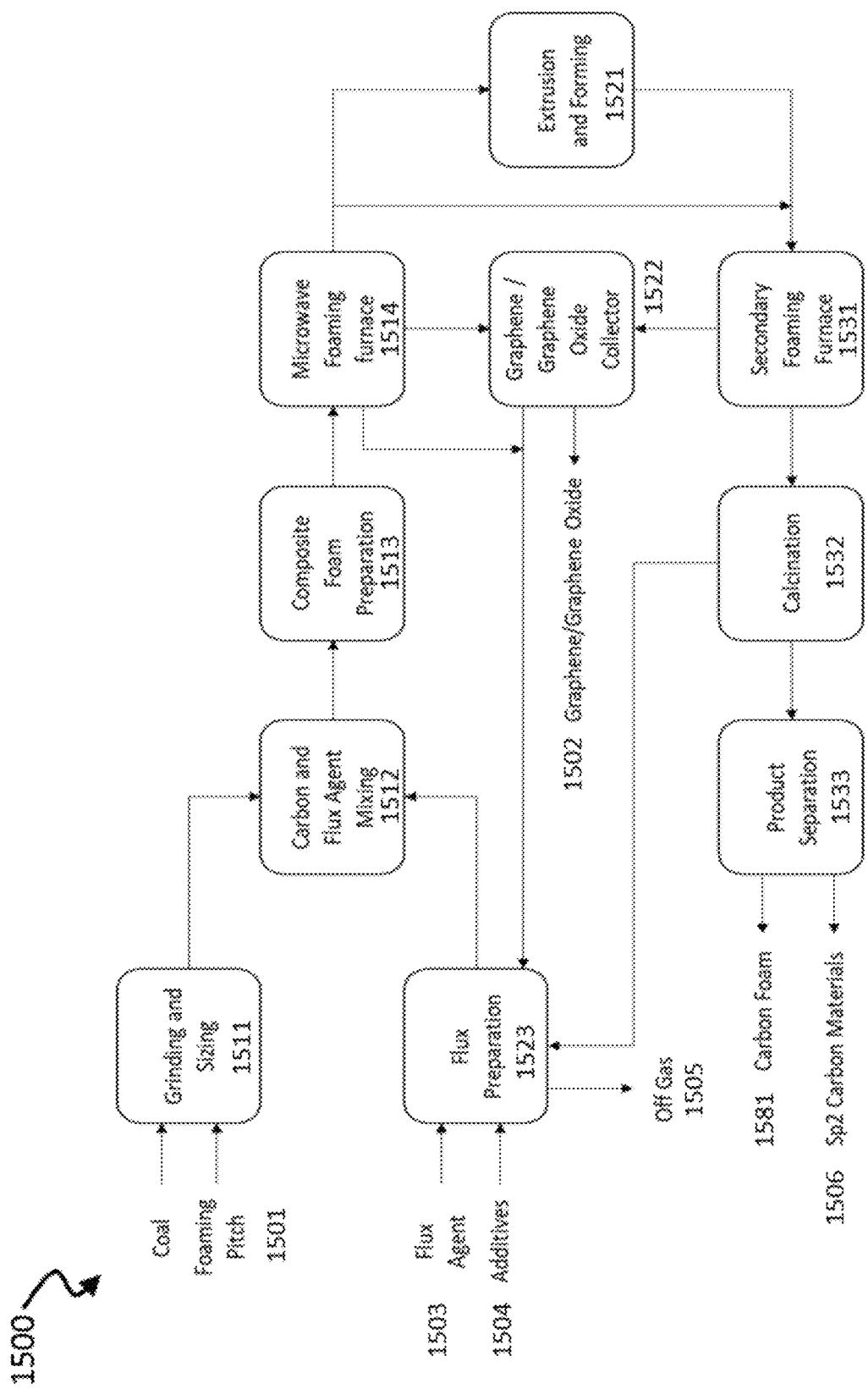
FIG. 15 shows a block flow diagram for a representative disclosed process for preparation of carbon foam and other disclosed carbon materials from coal using a flux agent and microwave radiation.
Figure 16:
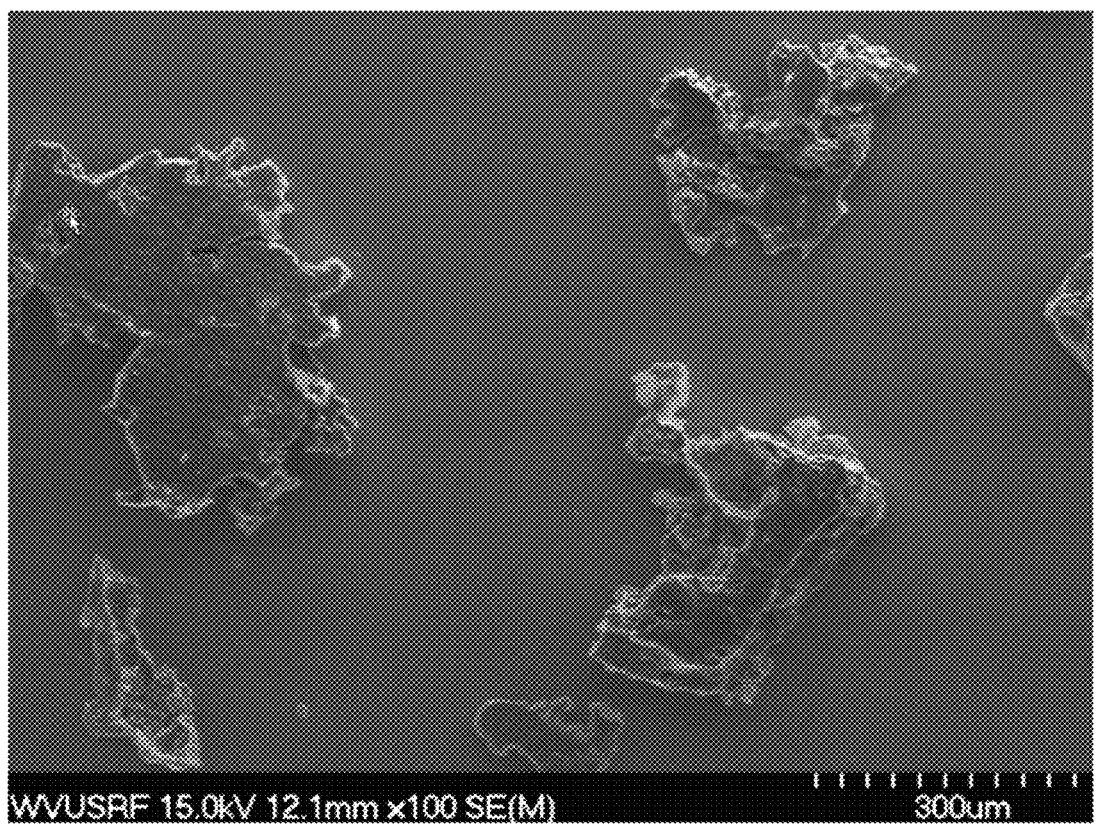
FIG. 16 shows a representative scanning electron micrograph (SEM) image of a disclosed graphene oxide formed in the solid phase using a disclosed method as described in Example 2. Similar results were obtained using disclosed methods as described in Examples 1 and 3-5.
Figure 17:
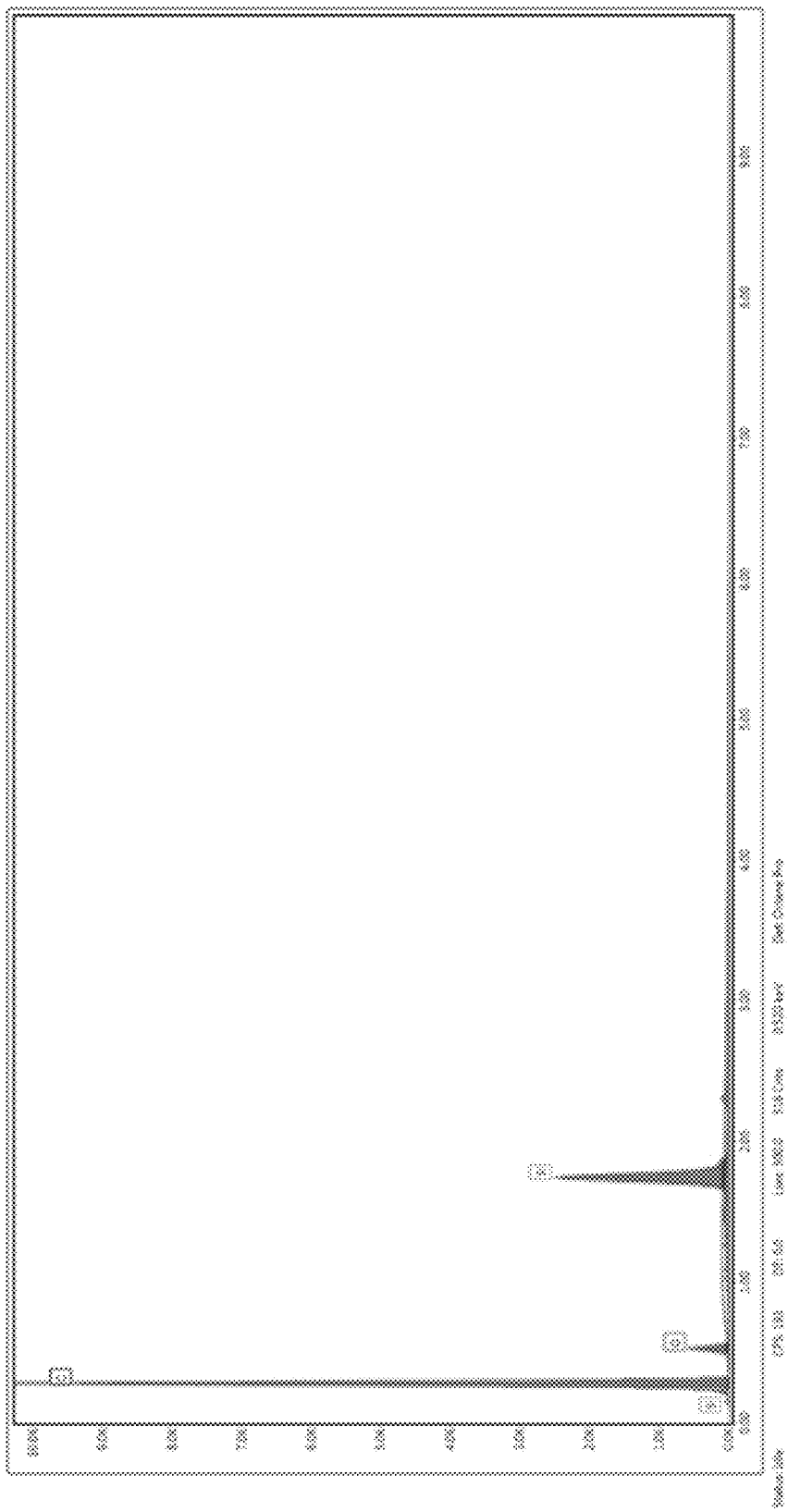
FIG. 17 shows representative elemental analysis data of the graphene oxide shown in FIG. 16. The data show that the material comprises primarily carbon and oxygen.
Figure 18:
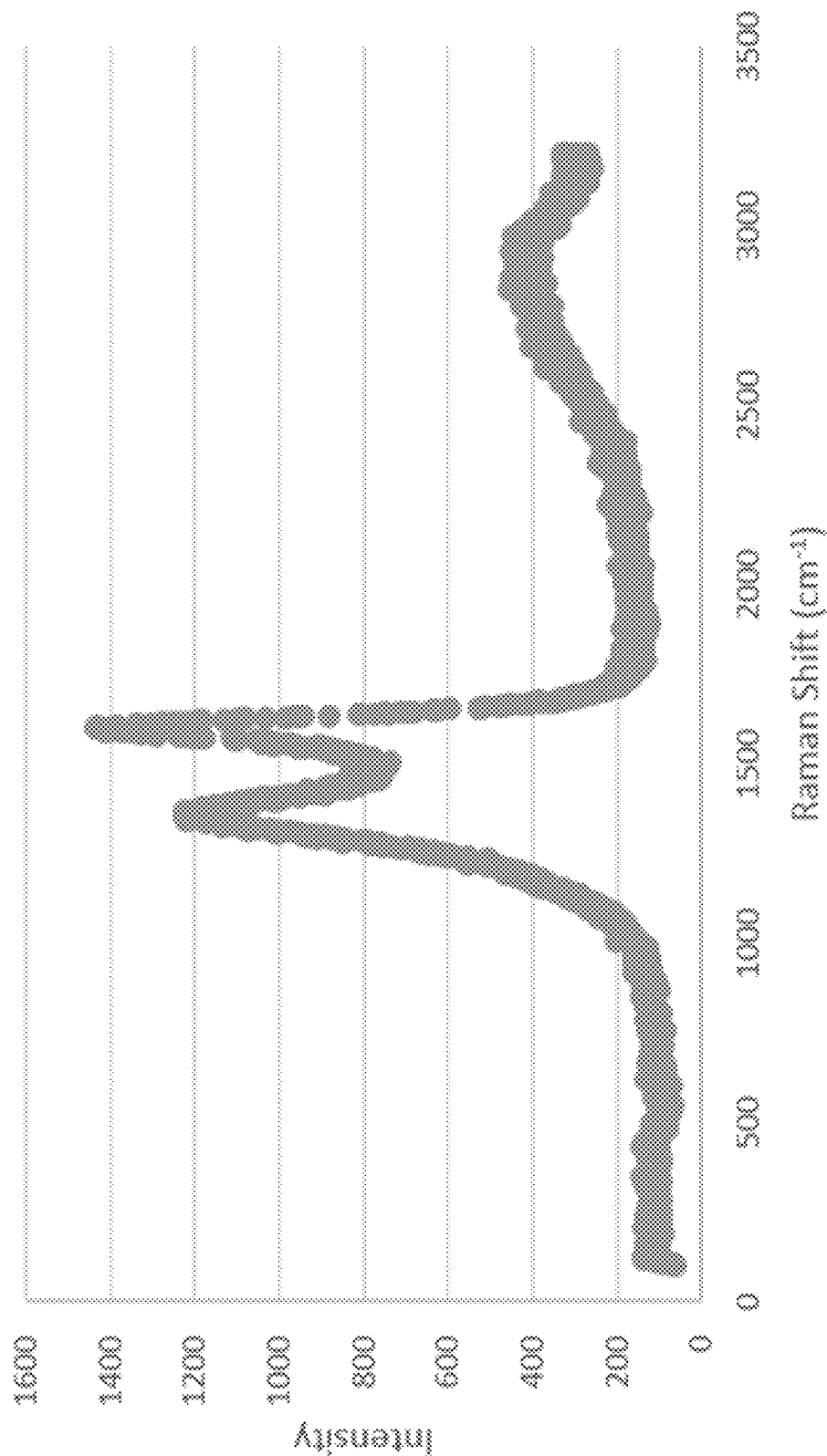
FIG. 18 representative Raman spectra data of disclosed $sp^2$ carbon material formed in the solid phase using a disclosed method as described in Example 2. Similar results were obtained using disclosed methods as described in Examples 1 and 3-5. The Raman spectra data are consistent with the material being a graphene oxide.

In some aspects, the overall process for producing carbon foam directly from coal mixed with a flux agent where the fusing of the coal particles occurs due to radiant energy sources is best illustrated in the block flow diagram in FIG. 15. The process begins with bituminous or caking coal. The coal can be run of mine coal, coal that has been run through a cleaning plant, or even recovered coal fines from the waste stream of a cleaning plant. This means the feedstock coal can contain a weight percent of ash. Furthermore, the different makeups and concentrations of ash in the feedstock coal while the effect of the characteristics of the final carbon foam products and composites employing the methods described in this disclosure.

The process begins to where coal is ground to a particle size range of anywhere between about 10 mesh and about 400 mesh. The particle size and particle size range are determined by several factors including desired characteristics of the end product, volatile content of the coal, ash content of the coal, and several variables comprising the condition of the flux agent in the ratio to the coal. After the coal is ground and the desired particle size range or combination of ranges is isolated, it is dried if the moisture content is above the desired range or would have an effect on the flux agent recycle and preparation system. Once the proper moisture percent is attained, the coal proceeds to the combination step where it will be mixed with the flux agent and any composite materials. In addition to bituminous coal as a source of the carbon molecules, foaming pitch prepared using the coal conversion process can be used. For example, coal conversion processes such as those described in U.S. Pat. No. 8,226,816 and U.S. patent application Ser. No. 14/513,745, each of which is incorporated by reference in its entirety.

In general, the flux agent will consist primarily of the material which responds to the frequency range of microwave radiation and interacts with the coal to generate the heat necessary to fuse the coal particles together. The secondary component of the flux can be of the following: recovered coal volatiles, a liquid product from the petroleum industry, or a combination of the two which is heated by the primary component and alters the interaction between the flux agent and coal particles. More specifically, the flux agent consists primarily of fructose with smaller amounts of kerosene or recovered coal volatiles from the coal conversion process which may contain phenanthrene.

The fluxing agent must be susceptible to microwave excitation. This means the energy band in the microwave region should be absorbed by the flux. High fructose corn syrup is used as the primary component of the flux agent. But other compounds that have OH's groups free to rotate also absorbs energy of this frequency. It is desired that the susceptible molecules would generate enough heat to fuse the particles and cause foams to form. The volatiles given off by that pyrolysis cause foams to form.

In addition to high fructose corn syrup, additives such as coal tars/petroleum residues or products would assist in the coal pyrolysis therefore the real fluxing agent could be a complex mixture of compounds. One should note that coal tars and petroleum products are not susceptible to microwave adsorption in the frequency of the house hold oven. A further complexity exists because microwave is a frequency range while the household oven is basically monochromatic with its maximum amplitude in the OH rotation range. Other microwave ovens can be tuned to the rotation energies of other functional groups.

In general, the fluxing agent is any compound or mixture of compounds that is blended with bituminous coal that adsorbs microwave energy in such a way as to heat the coal material to its pyrolysis temperature. The coal, during pyrolysis, gives off volatiles which in the presence of the fluxing agent results in the manufacture of carbon foam.

Once the coal and flux agent are prepared they are mixed together with the ratio of flux agent that ranges from 30% to 70% by weight of the coal particles. The main factor which determines the ratio of coal particles to flux agent is the inherent volatile percent of the feedstock coal. High volatile bituminous coals will require less flux agent then low volatile bituminous coals. The other variables which affect the ratio of coal particles to flux agent are the makeup of the flux agent itself and the additives used, particle size distribution of the coal, and the desired final products produced. The greater the overall amount of volatile material in the mixture will produce a greater amount of sp2 hybridized carbon as the final product. The resulting mixture of coal particles and flux agent forms a viscous semi fluid material which will be referred to as the coal flux material.

In addition to the coal and flux agent makeup, materials for composite carbon foams can be added in this mixing step. Composite materials such as previously made foam particles, carbon micro and nanoparticles, carbon micro and nano fibers, diamond powder, graphene and/or graphene oxide particles, graphite, and/or graphite flakes can all be added in this mixing step to produce composite carbon foams.

In order to produce a consistent carbon foam with the proper characteristics using these methods, it is necessary to produce a homogeneous mixture of coal particles and flux agent in the coal flux material. The surface for all of the coal particles must be properly wetted with the flux agent to properly fuse into a carbon foam. Based on the high viscosity of the coal flux material, intensive mixing is required. The flux agent is added in several increments while the coal particles are agitated to mix the material together.

The coal flux material is then prepared for the foaming step using microwave radiation. This is done by placing the coal flux material into a container and compressing the viscous material to fill the container and remove any void spaces or air pockets. The preparation for additional carbon foam composite materials are also accomplished in this step. The first is the addition of carbon fibers to the foam which act as metal rebar in concrete. This will add strength to the carbon foam as well alter the conductive properties. Other preparation methods for composite foams include layering the foam and adding additional volatile additives between the layers to create sp2 hybridized carbon layers within the foam. An additional method of producing composite foams is to layer the foams with different coal flux materials prepared from different feedstocks or the use of various particle sizes.

The prepared and compressed coal flux material is then subjected to microwave radiation which rapidly heats the material. A main component for the primary ingredient the flux agent is to respond to microwave radiation. Therefore, the radiation initially begins to heat up the primary component of the flux agent which is evenly dispersed in the coal flux material. This in turn heats the entire mass of the material to a point where the flux agent and volatile material in the coal combined to fuse the particles together to form carbon foam.

The coal flux material is heated to a point between 250° C. and 700° C. where the coal particles begin the process of fusing into a carbon foam. At this point, the coal flux material is still semi fluid and can be molded in to various shapes and sizes while at temperature. During this process, the temperatures liquefy and volatilize components of both the flux agent and volatile material within the additives of the flux agent as well as in the coal itself. If a high enough temperature is reached and enough volatiles removed, the foam will set as the particles fuse together. If conditions are reached where the coal particles begin to fuse into a foam but are still fluid, the coal flux material can be molded into various sizes and shapes and even extruded into various sizes and shapes.

If the coal flux material is formed into various sizes and shapes, additional volatiles are required to be removed for the coal particles to completely fuse into a carbon foam structure. This is accomplished with secondary furnace which can supply heat in a variety of methods. These methods include traditional thermal heating, microwave radiation, or other forms of radiation including infrared.

The only need for the separate primary and secondary heating steps prior to calcination is for the molding and shaping of the carbon foam into specific shapes. Otherwise, the two heating steps prior to calcination can be combined into one heating step or furnace in a continuous process that produces the desired results. The desired result is an electrical conductive carbon foam where the particles are completely fused or near completely fused and set in place. If the carbon foam is rigid and electrically conductive, the carbon foam near the boarders of the material can be completely fused during the calcination step. An additional definition would be when the carbon foam has properties of a solid and no longer exhibits fluid physical properties.

During the phase when the coal particles are being fuse together and the flux agent and volatiles are at temperature, sp2 hybridized carbon is formed based on the ratio of low softening point carbon molecules forming a second less viscous state. The sp2 hybridized carbon as a secondary product can be in the form of graphene, graphene oxide, graphite, and/or graphite flakes. The production and characteristics of the secondary carbon product are dictated by the excess materials in the coal flux material ratio that form the secondary, less viscous fluid state during the foaming process. The second main variable which influences the characteristics of the sp2 hybridized carbon formed is the flux agent makeup and more specifically the additives used. Since the additives used are mostly in the form of hydrocarbons from petroleum production and recovered volatiles from the coal conversion process, the properties and molecular orientation of the volatiles are the variables used to control the final products of the foaming process.

In addition to the sp2 hybridized products produced in the solid phase, sp2 hybridized carbon products are also produced from the vapor phase. As the coal flux material is heated to varying temperatures, volatile material escapes the mixture. The volatile material escaping comes from both sources of the flux agent and components of the coal particles. Given the difference in properties of volatile material, the vapors escaping the flux agent component can be removed at different temperatures from the vapor component escaping the mixture from the coal and coal liquid additives. The vapors escaping from the coal and coal liquid additives form a thin layer of graphene and/or graphene oxide which can be controlled by the residence time of the vapors exposure the substrate material. The graphene and/or graphene oxide collector is a specialized piece of equipment designed for semi-continuous processing using these methods. This piece of equipment is described in greater detail later in the disclosure.

After the carbon foam has been completely fused or near completely fused, the final heat treatment is referred to as calcination. It is determined by the desired end products of the carbon foam and secondary sp2 hybridized carbon materials. Calcination temperatures range from 900° C. to 1350° C. The calcination step of the carbon foam can be accomplished by thermal heating which applies a higher temperature to the material and slowly penetrates the foam until a uniform temperature is attended.

Microwave Furnace: To develop this technology into the greatest commercially viable process, a continuous carbon foam processing system must be employed. The continuous method would require a device which would supply differing and increasing levels of microwave radiant to properly supply energy to the foaming mixture and achieve the desired results. This device would also operate intermittently with mechanical pressure to compress the carbon foam as it is processed if needed.

Graphene and Graphene Oxide Collector: During the foaming step, the foaming pitch particles or composite materials are fused together and volatile materials escapes in the coal flux material in the vapor phase. The temperature of the coal flux material is then increased to between 300-700° C. In this temperature range, the escaping volatiles collect on surfaces to form graphene and/or graphene oxide. The graphene collector will consist of stacks or layers of surfaces for the graphene and/or graphene oxide to collect on. The process can be continued with heating in the furnace to calcination temperatures of greater than 900° C. After the calcination step, any graphene, graphene oxide, graphite, and/or graphite chips can be separated and collected as a product.

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

C. EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Figure 2:
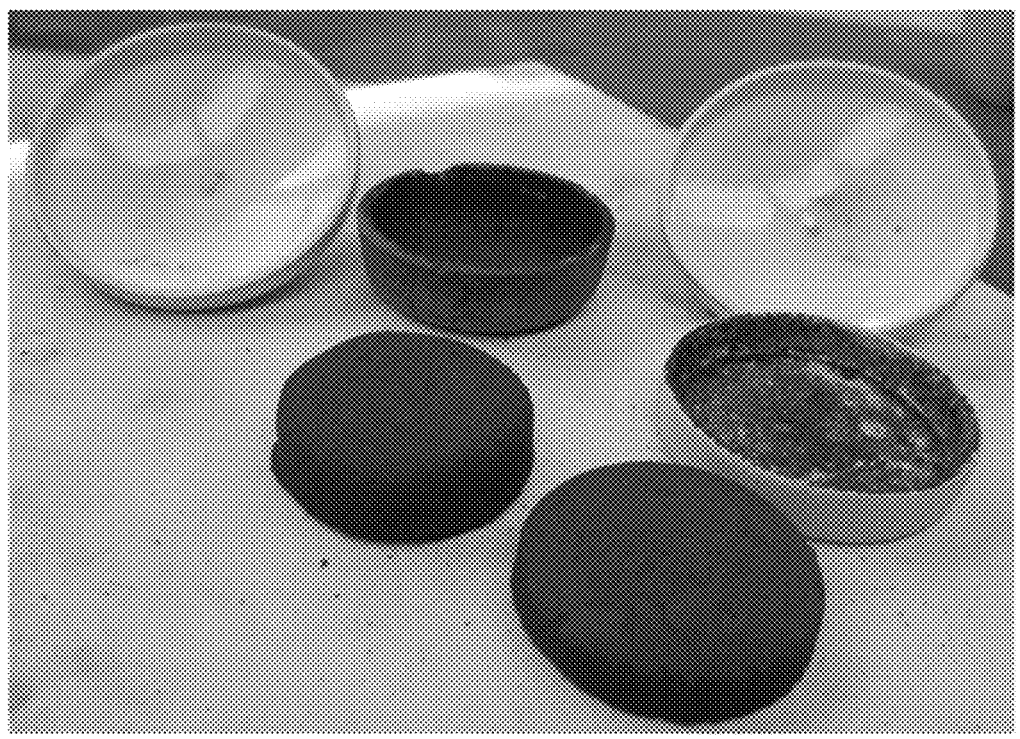
FIG. 2 shows a representative image of a disclosed 80-100 mesh particle size carbon foam prepared from low volatile bituminous coal feedstock using a disclosed method as described in Example 1.

Example 1. Carbon Foam Production at Atmospheric Pressure Using Low Volatile Bituminous Coal Described herein is a process of producing carbon foam at atmospheric pressure starting with a low volatile bituminous coal from Pennsylvania ground to a particle size distribution of 80 to 100 mesh. The coal was then combined with a flux agent at a 2 to 1 ratio by weight consisting of 95% fructose and 5% recovered distillation volatiles from the same coal. The coal and the flux agent were was combined to a homogenous mixture and pressed into the crucible (see FIGS. 1 and 2). The crucible was then placed inside a 1 L beaker covered by a watch glass. The beaker containing the crucible was placed in an 1100 W microwave. The microwave was operated for five minutes at power level 3 (the microwave apparatus used had a total power output of 1100 watts; a power level setting of 3 is about 330 watts output on this apparatus). The carbon foam which was produced expanded slightly above the level of the crucible which was then pushed back down using a larger ceramic crucible. The carbon foam and crucible were then heated to 600° C., and the calcined at 900° C.

The level of volatiles in a coal sample can be determined as described in the ASTM Standard Proximate Analysis Test. In the present example volatiles were determined as described below in Table 1. The analysis was carried out at the National Research Center for Coal and Energy (NRCCE) using a Leco TGA701 Thermogravimetric Analyzer.

TABLE 1

Proximate Analysis Data.

| Parameter | Amount |
| --- | --- |
| Moisture % | 1.40 |
| Volatile % | 14.38 |
| Ash % | 22.28 |
| Fixed Carbon % | 61.94 |

Coal Preparation:

The process described herein begins with Pennsylvania bituminous coal that was received in large plastic bags roughly 60 pounds each. It was received after having been processed at a standard coal cleaning plant. The coal was fed three times through a hammer mill to reduce the particle size to about 2 mm. The coal was then fed into a coal pulverizer, which reduced the particle size to about 60 mesh. The pulverized coal was then sifted through a large 60 mesh sieve to remove any larger particles that were not sufficiently pulverized. A portion of the pulverized coal was maintained for other experiments while the rest of the coal was processed into pitch through the coal conversion process described herein below. A portion of the pitch produced was then further processed into foaming pitch in the process described in greater detail in Example 3.

The particle size distribution for this example was determined to be 80-100 mesh. Briefly, a stack of sieve trays was assembled to separate the particles into the desired ranges. A collection pan placed on the bottom of the stack, followed by a 100-mesh sieve on top of that, next followed by a 80-mesh sieve was placed on top of the 100-mesh sieve, and finally the stack was top by a 60-mesh sieve. The pulverized coal, produced as described immediately above, was poured on top of the 60-mesh sieve and covered with the sieve lid. The assembled sieve trays were placed in a sieve shaker (orbital motion) and ran for 10 minutes. The assembled sieve trays were then disassembled one at a time and the mesh surface of the of the sieve trays wiped with a rubber spatula to eliminate any blinding effects. The sieve trays were then reassembled and placed back into the sieve shaker which was operated for an additional 10 minutes. The 60-80 mesh portion, the 80-100 mesh portion, and the less than 100 mesh portion of the sample were collected, weighed, and stored for various experiments.

Flux Agent Preparation:

A 200 mL plastic container was weighed and labeled for the flux agent preparation of this example. About 150 g of pure fructose was added to the container, and then about 7.5 g of recovered volatiles were added to the container. The recovered volatiles were from the vacuum distillation portion from the coal conversion process operated with the same bituminous coal as in this example. The recovered volatiles in this example were obtained from a coal conversion process such as that described previously above (i.e., described in U.S. Pat. No. 8,226,816 and U.S. patent application Ser. No. 14/513,745, each of which is incorporated by reference in its entirety). They were collected from the vacuum distillation step of the process and comprised a mixture of hydrocarbons with a boiling point range of about 80° C. to about 300° C.

The plastic container was then sealed and agitated vigorously to mix the contents of the flux agent. The container was shaken by hand for 60 seconds and inspected for homogeneity. Although it appeared well mixed, the container was again shaken by hand for 60 seconds and inspected. There to no change observed so the mixture was consider homogenous.

Foaming Mixture Preparation:

A 250 mL glass beaker was labeled and weighed, and then 100 g of the coal, prepared as described above, was added. The coal used had a particle size range of 80-100 mesh. The plastic container which contained the flux agent was shaken vigorously for several minutes, and then 30 g of the flux agent mixture was added to the beaker containing the coal. The contents of the beaker were then stirred for several minutes while scraping the sides and bottom of the beaker in an attempt to create homogenous mixture suitable for the microwave foaming experiment. An additional 20 g of flux agent was added to the mixture to achieve the appropriate level of wetting of the coal, and the contents of the beaker were once again stirred for several minutes. For consistent foam production it is important that a homogenous coal/flux agent mixture is used. To assist in the mixing, a handful of the mixture was removed and kneaded by hand using rubber gloves. The kneaded portion of the sample was then added back to the beaker and stirring continued. The cycle of kneading and stirring action was repeated several times until a homogenous mixture of coal to flux agent was observed.

Loading the Mixture into the Crucible:

Once a homogenous mixture of coal and flux agent was prepared, it was loaded into the previously weighed crucible. A sufficient amount of the coal material and flux agent mixture was loaded into the crucible to cover the entire bottom and roughly fill the crucible without packing the mixture. The mixture was then compressed into the crucible with further kneading of the mixture by hand. Once the mixture properly compressed into the crucible, an additional amount of the mixture was added and kneaded by hand into place. This action repeated itself several times until the crucible was filled and the mixture was not further compressible. At this point, the flat edge of a paint scraper was used to press the mixture into a mold of the crucible. Any over flow of material that was not able to be compressed into the crucible was scraped directly across the surface. Once the crucible was completely filled and compressed, it was weighed.

Microwave Radiation to Produce the Initial Foam Structure:

The crucible then was placed inside of a 1 liter standard glass beaker that was covered with a 6 inch diameter watch glass. This configuration allows the volatiles to escape the beaker and avoid any pressure build-up. The glass of the beaker does not respond to microwave radiation in the same manner as the coal, and accordingly, the surface of the beaker and watch glass are at lower temperature compared to the mixture in the crucible. Therefore, as the volatiles escape and come in contact with the surfaces they will condense on the interior surface of the beaker and accordingly contained therein. The 1 L beaker containing the crucible of the carbon-based foaming mixture was placed in the 1100 Watt microwave. The operating conditions of the microwave were then set for 5 minutes at a power level 3 (the microwave apparatus used had a total power output of 1100 watts; a power level setting of 3 is about 330 watts output on this apparatus). The beaker containing the sample crucible was then removed from the microwave immediately after the foaming had taken place.

Post-Microwave Radiation Condition of the Foam:

After the beaker containing the sample was removed from the microwave, the watch glass was removed and the carbon foam sample removed from the glass beaker while still at temperature. The foaming sample was then placed on a six inch square ceramic tile. It was observed that the middle of the carbon foam sample contained an outwardly bulging portion. Without wishing to be bound by a particular theory, it is believed that the bulging portion formed due to the volatiles escaping from the foam. The carbon foam sample and the bulging portion were malleable and could be molded or shaped. Thus, without wishing to be bound by a particular theory, the carbon material is in a pseudo-fluid state while at temperature and does not form into a solid foam structure until it has sufficiently cooled. Accordingly, it is possible to mold and/or extrude a partially formed carbon foam into specific sizes and shapes without the need for expensive post processing to form specific shapes for the end product. The sample was weighed, and then placed into a ceramic crucible for the first heat treatment portion of the process. The foamed sample after this step is referred in the next step as a "foaming/flux pitch."

Creating a Non-Oxidizing Environment:

In order to heat the foam sample to higher temperatures, a non-oxidizing environment or environment void of oxygen is required. Without wishing to be bound by a particular theory, it was believed that heating at higher temperatures in the presence of oxidizing environment would lead to combustion of the carbon foam resulting in production of ash rather than production of a stable carbon foam. In order to maintain consistent heating rates for this example, flowing of an inert gas, such as nitrogen or argon, over the sample during heating was determined to be not optimal. Moreover, it was determined that filling a furnace with an inert gas was not practical either since it would not be possible to isolate the furnace comprising an inert gas due to the presence of volatiles and other gases escaping from the foaming pitch as it is heated. Therefore, the process utilized a method of isolating a crucible, containing the foam from the previous step, from an oxidizing environment by preventing oxygen from reaching the interior of the crucible and foaming pitch contained therein.

The crucible was packed with the foaming pitch from the previous step above, and the weighed. The crucible was fitted with an appropriately sized lid which had also been weighed. The crucible was placed inside of a ceramic bowl with a flat bottom and vertical sides roughly 8 inches in diameter by 4 inches high. Additional carbon foam samples were also placed in the ceramic bowl to receive the first heat treatment.

Graphite chips with the consistency of sand (about 1-2 mm in size) were then poured over the crucibles into the ceramic bowl to a height of roughly 2⅝ inches that completely covered the crucibles fitted with lids. The graphite chips being primarily composed of carbon. Without wishing to be bound by a particular theory, it is believed that the graphite chips oxidize to carbon dioxide prior to the oxygen reaching the crucibles with the foaming pitch. That is, the graphite chips are a sink for any oxygen entering the system and provide an alternative chemical route for any oxygen before reaching the foaming pitching inside the crucible. The graphite chips can also allow any volatiles or other gases escaping from the foaming pitch sample to exit the ceramic bowl and ultimately the furnace.

On top of the graphite chips were placed three layers of steel wool. The first two layers of steel wool were ultrafine while the top layer was course. For the first layer, two ultrafine steel wool pads were unrolled into flat rectangular sheets. One of the long sides of both sheet was stretched by hand to better fit into the curved inside surface of the ceramic bowl. The stretched sheets were then placed on the surface of the graphite chips inside the ceramic bowl. They were pressed down by hand and fitted to create a consistent layer of the steel wool covering the entire cross-sectional area of the ceramic bowl. The ceramic bowl was then rotated 90° and the second layer of ultrafine steel wool was inserted in the same manner as the first. This is to cover any gaps in the center of the steel wool and create a more consistent layer at the edge of the ceramic bowl. The ceramic bowl was once again rotated 90° and the third layer of course still wool was inserted in the same manner.

With the ceramic bowl now completely filled, the steel wool was once again stretched and fitted into the proper shape. The steel wool extending above the rim of the ceramic bowl was then pressed down along the vertical sides of the bowl. This provided an additional depth of steel wool at the edge of the container which is the most likely place for oxygen to enter. A nine inch square ceramic tile was then placed on top of the ceramic bowl. This configuration prevented oxygen from reaching the foaming pitch samples and also allowed the volatiles and other gases produced in the experiment to escape. Furthermore, consistent heating rates can be applied to the samples by avoiding flowing inert gas to the furnace.

First Heat Treatment to 600° C.:

Once the sample and non-oxidizing environment had been prepared as described above, the ceramic bowl was placed inside of a furnace. The furnace was programmed with the following heating steps: (a) the temperature of the furnace was increased from room temperature at a rate of 200° C. per hour to 400° C.; (b) after the furnace reached 400° C., the heating rate was decreased to 100° C. per hour until the furnace reached 600° C.; (d) the temperature of the furnace was held at 600° C. for three hours; and (e) the furnace was shut off and allowed to cool over a period of ten hours. Once the furnace had cooled, the ceramic bowl was removed. The ceramic tile was removed from the ceramic bowl. The steel wool, which showed significant oxidation and fusion into a single mass, was removed and discarded. The graphite chips were removed and retained for re-use. Any remaining graphite chips were dusted off to avoid contamination of the carbon foam sample with the graphite chips. The carbon foam sample was then removed from the crucible, inspected, and weighed. It was determined that the starting weight for this example was 27.2 grams and the final weight 21.6 grams. The foam sample was also tested for electrical conductivity using a voltmeter, and the sample was found to be conductive.

Calcination to 900° C.:

After the carbon foam was formed following the microwave radiation and the first heat treatment steps described above, a second heat treatment was performed to drive off additional volatiles, increase the carbon percent of the foam, and increase the strength and crush resistance of the foam. Briefly, for calcination, the foam sample from the previous step was placed back in the original crucible and covered with the original lid. The crucible was then placed back into the ceramic bowl and covered with graphite chips and three layers of steel wool as described in the nonoxidizing environment section. The ceramic tile was placed back on top of the ceramic bowl and the whole assembly was placed back inside the high temperature furnace. The furnace was then programmed to calcine the carbon foam samples to 900° C. per the following heating program: (a) the furnace was heated at a rate of 500° C. per hour up to a temperature of 400° C.; (b) then the heating rate was reduced to 100° C. per hour until a temperature of 550° C. was attained; (c) the heating rate was reduced to 50° C. per hour until a temperature of 700° C. was attained; (d) the heating rate was then decreased to 25° C. per hour until a temperature of 900° C. was attained; and (e) temperature was held at 900° C. for one hour, then the furnace was turned off and the furnace allowed to slowly cool over a period of 12 hours. After the contents of the furnace were cooled, the ceramic bowl containing the samples was removed from the furnace and emptied in the same manner as the first heat treatment. The calcined carbon foam samples removed from the crucible and weighed, and the electrical conductiveity determined.

It should be noted that the process can be carried out without carrying out the two heat treatment, i.e., the first heating step in the furnace and the calcination step, as discrete and separate step. That is, it is contemplated that the first heat treatment and calcination sections can be performed in one step. However, in the the example described herein, separate steps of the first heating step and calcination step were carried out to allow characterization of the carbon foam material after each of these heating steps, e.g. characterization of electrical conductivity using a voltmeter, and the sample was found to be conductive. Samples can be further tested for volatile percent decrease and other properties after the heating step.

In various aspects, it is contemplated that if the foam sample has sufficient electrical conductivity, then the first heating step and/or the calcination step can be carried out using inductive or radiant heating methods. For carbon foams that are not sufficiently electrically conductive, the formed carbon foam can be further processed to higher temperatures using traditional thermal heating methods or by rapidly heating the carbon foam employing additional radiant energy sources in the form of inferred radiation using a lamp and/or employing additional microwave radiation to bring the carbon foam to a higher temperature.

Example 2. Carbon Foam Production at Atmospheric Pressure Using Low Volatile Bituminous Coal (at a Larger Scale Compared to Example 1)

The procedure, methods, and sample produced for Example 2, described herein, were very similar to that described above for Example 1. The experimental procedure and materials produced in Example 2 were prepared from the same foaming mixture of bituminous coal and flux agent as described in Example 1. In addition, the microwave radiation section, first heat treatment section, and calcination section are also the same as that described for Example 1. The only difference between Examples 1 and 2 were in the size and shape of the crucible used in the experiment.

Figure 3:
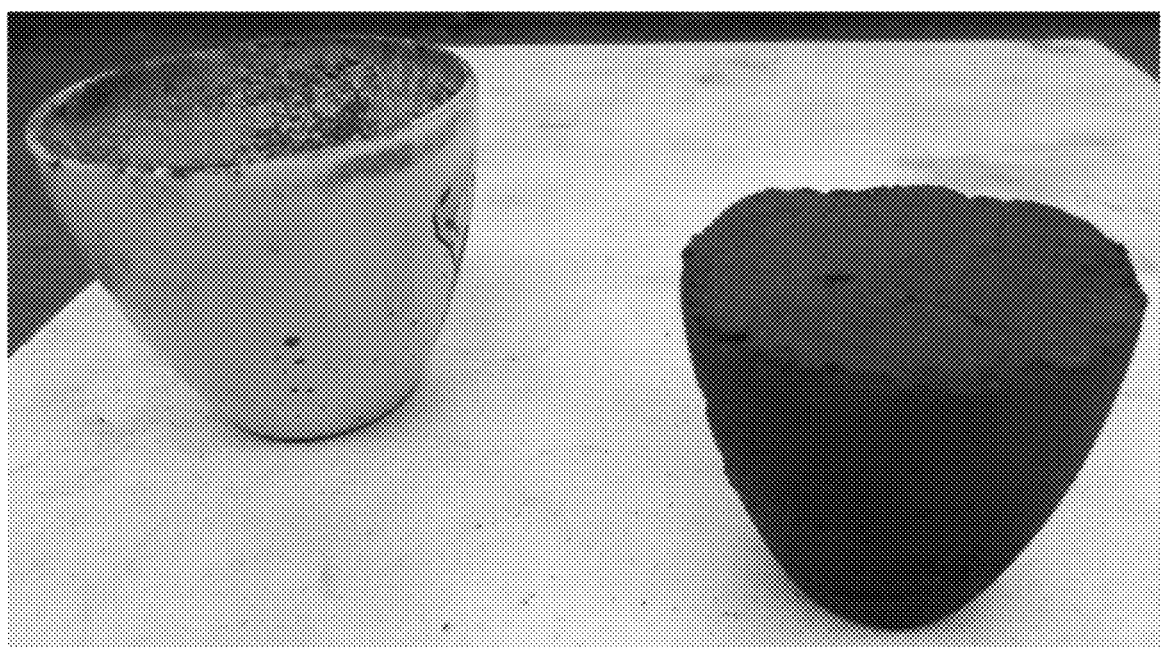
FIG. 3 shows a representative image of a larger sample of a disclosed carbon foam prepared from low volatile bituminous coal feedstock using a disclosed method as described in Example 2.
Figure 4:
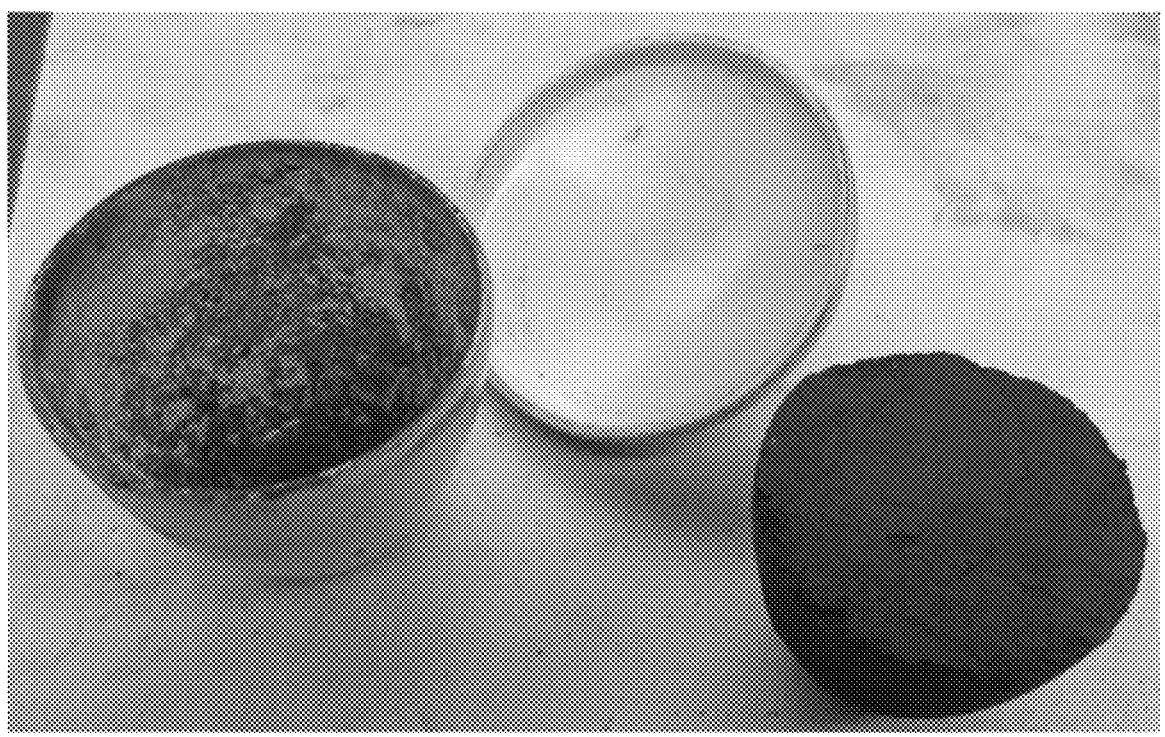
FIG. 4 shows a representative image of a larger sample of a disclosed carbon foam prepared from low volatile bituminous coal feedstock using a disclosed process and the additional carbon materials produced remaining in the crucible using a disclosed method as described in Example 2.

The results obtained with Example 2 suggested that scalability of the disclosed process is feasible. Moreover, the data obtained with Example 2 demonstrate that different shapes of carbon foam can be produced using the disclosed processes. Images for the carbon foams produced in Example 2 are shown in FIGS. 3 and 4. The images show that a difference between Examples 1 and 2 is in the vertical height of the sample produced. The production of similar samples, despite the difference in vertical height of the samples, is notable because the volatiles escaping from the foam during the microwave radiation section, first heat treatment section, and calcination section must travel through a greater amount of material in order to escape the sample with a greater vertical distance. It should be noted that the crucible used in Example 1 was of a disc geometry with dimensions: diameter, 45 mm; and height, 8 mm. The crucible used in Example 2 had the following dimensions: bottom diameter was 25 mm; top diameter was 50 mm; and the height was 40 mm.

A minor difference observed during the experiment was that after the microwave radiation treatment, the carbon foam produced in Example 2 swelled a greater amount above the rim of the crucible versus that observed in Example 1. Without wishing to be bound by a particular theory, it is believe that the pseudo-fluid state of the material, the greater amount of volatiles escaping from the foam of Example 2 resulted in greater swelling or bulging of the pseudo-fluid foam after the microwave heating step. It is contemplated that the process can further comprise use of mechanical pressure to compress the foam back into its original form during the microwave heating step. It was observed that swelling typically occurred earlier in the microwave heating process (mostly with the first minute even at the lower power settings). Without wishing to be bound by a particular theory, swelling is principally caused by the rapid vaporization of the light volatiles and moisture in the flux agent and inherent moisture contained in the coal. Accordingly, it is believed that the swelling can also be reduced by heating the sample at a slower rate at the beginning of experiment. It is also believed that the swelling can be reduced by heating the sample, coal, and/or flux agrent to temperatures of about 105° C. to drive off any moisture and low boiling point volatiles prior the the microwave radiation step.

Figure 5:
FIG. 5 shows a representative image of a disclosed carbon foam prepared low volatile bituminous coal feedstock and foaming pitch using a disclosed process. The foaming pitch was prepared using a disclosed method as described in Example 3.
Figure 6:
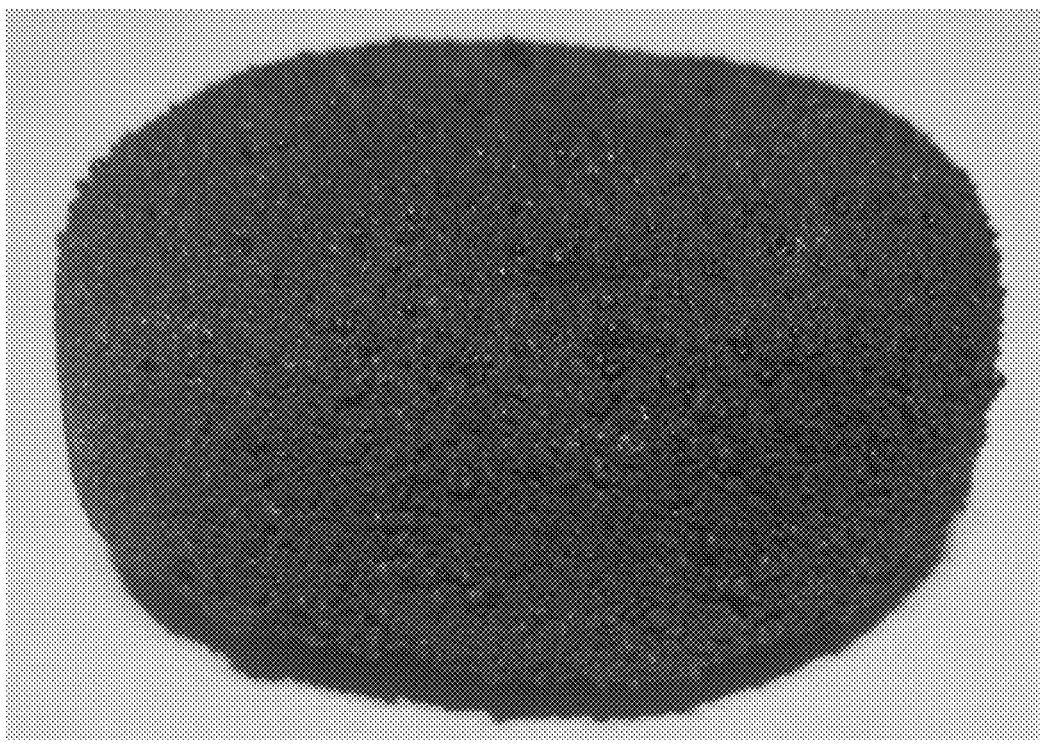
FIG. 6 shows a representative image of the underside of the carbon foam shown in FIG. 5. The image shows the underside of the carbon foam, i.e., the surface of the carbon foam in contact with the crucible.

Example 3. Carbon Foam Production at Atmospheric Pressure Using a Mixture of Low Bituminous Coal and Foaming Pitch The preceding examples utilized coal directly as a starting material for preparation of the disclosed carbon foams. Example 3 describes a disclosed process wherein a carbon foam is produced using a combination of the bituminous coal (as described above for Examples 1 and 2) and a foaming pitch material produced using coal conversion process. As described above, the bituminous coal particle size range was between 80-100 mesh. The foaming pitch material was crushed and ground to a particle size of 20-50 mesh. The two were mixed together at a ratio of 80 wt % coal material and 20 wt % foaming pitch material based on the weight of coal material and foaming pitch material. The flux agent, as described above for Examples 1 and 2, was added at weight ratio of three parts coal/foaming pitch mixture to one part flux agent. The mixture comprising the coal material, foaming pitch material, and the flux agent is designated as the foaming mixture. The foaming mixture was loaded into the crucible and exposed to microwave radiation as described above for Examples 1 and 2. The carbon foam was then heat treated to 600° C. and calcined to 900° C. using the same procedure as described above for Examples 1 and 2. Images of the carbon foam produced in Example 3 are shown in FIGS. 5 and 6.

Below is a description of the method, procedure, and equipment used to prepare the foaming pitch material. It begins with a description of the coal conversion process and procedure to produce standard pitch from low rank or non-caking coal. The next section describes the process for producing the foaming pitch, and further grinding and sizing of the foaming pitch. The final section below describes in further detail of the foaming mixture before it was loaded into the crucible.

Coal Conversion Process—Pitch Production:

The process described herein begins with lignite coal ground and passed through a 60-mesh sieve. This is the standard particle size range used for the testing system, and the particle size can be varied without departing from the disclosed process. In particular, the particle size may be further optimized during scaling for commercial operations. Following grinding and sieving, a slurry was prepared by dispersing 15 pounds of the ground coal in 42 pounds of conditioned solvent recycled through the disclosed process. The solvent consists of condensed and recycled volatiles from previous experiments employing the carbon conversion process. Three pounds of hydrogenated vegetable oil was also added to the slurry. Without wishing to be bound by a particular theory, it is believed that the vegetable oil can act as a hydrogen donor during the disclosed conversion reaction.

The slurry was mixed via agitation, and then transferred into a stirred 10-gallon reactor vessel for the coal digestion reaction. The mixture homogeneity was maintained in the reactor vessel. Inside the reactor vessel, the slurry was heated to about 120° C. and held at this temperature to allow vaporization of any water and low boiling point volatiles present in the coal and/or recycled solvent. The vapors, comprising water and low boiling point volatiles, produced in this heating step were vented to a moisture collection vessel and removed from the reaction mixture. The contents of the moisture collection vessel were collected, weighed, and sampled.

The reactor was then isolated and the temperature increased to about 550° C. and held there for about one hour. The pressure inside the reactor was maintained between about 500-600 psig, with venting used to remove excess volatiles from the reactor into an expansion tank. The vapors produced at about 550° C. were passed through a water cooled heat exchanger enroute to the expansion tank, providing condensation of the vapors to a volatile liquid mixture. The liquid volatiles recovered from the coal digestion reaction were weighed, sampled, and added to the recycle solvent mixture for use in future experiments. The non-condensable gases produced by the reaction were further vented from the expansion tank to a scrubber. The non-condensable, vented gases comprise hydrogen sulfide. Without wishing to be bound by a particular theory, it is believed that the hydrogen sulfide is produced by the removal of sulfur from the coal during the conversion reaction process.

Once the reaction phase was complete, the remaining pressure in the reactor was vented to the expansion tank. The remaining liquid contents of the reactor, which are a low softening pitch mixture, were transferred into a larger volume holding tank called a flash vessel to cool. The low softening point pitch mixture, which comprises a mixture of reacted coal and mineral matter, remained in the flash vessel until the temperature was reduced to 150° C. When the low softening point pitch mixture had reached the proper temperature, the low softening point pitch mixture was transferred into a centrifuge processing tank comprising a centrifuge is fixed atop a processing tank. The centrifuge system was also equipped with a gear pump to recycle the extract through the flow driven centrifuge where the ash is concentrated and collected within the rotating spindle. When the ash removal process was complete, the centrifuge spindle was removed and weighed for mass balance data. The enriched ash centrifuge tails were removed from the spindle and maintained for analysis. The spindle was cleaned and prepared for the next experiment.

The centrifuge was a "spinner-type centrifuge" most often used to separate particulate matter from industrial motor oil. This particular centrifuge was selected for the disclosed coal conversion process because the concentrated ash removed from the extract is collected and maintained in the rotating spindle. The centrifuge tails were collected as a cake-like residue of mineral matter and volatiles along the inside surface of the centrifuge spindle. The collected residue can be rich in mineral matter and is unaltered by the relatively mild conditions of this process. Depending upon the specific characteristics of the coal used in the process, the collected mineral matter can contain appreciable levels of rare earth elements (REE), and accordingly, can be considered an enriched rare earth elemental feedstock for further refining.

The efficiency of the centrifugation step can be limited by the mechanics of the pump and the viscosity of the extract. It is to be understood that without departing from the disclosed process, the disclosed procedure can be scaled to use a centrifuge comprising a motor driven scroll-type centrifuge for improved efficiencies.

The de-ashed pitch was then pumped into a vacuum distillation apparatus, and the distillation carried out by increasing the temperature to about 280° C. while maintaining a vacuum of about 50 torr. The vacuum distillation column was equipped with a low flow rate nitrogen sparge to help facilitate the flow of volatiles from the pitch. Moreover, without wishing to be bound by a particular theory, the nitrogen sparge is believed to facilitate orientation the various moieties in the carbon pitch as it forms. The overall distillation system was also equipped with a set of distillate collection vessels and condensers in parallel to collect different "cuts" of the potentially valuable distillation volatiles. The volatiles were collected for analysis and weighed for mass balance data. The pitch was then drained from the distillation column as a liquid at elevated temperature. The pitch was allowed to cool to room temperature where it solidified.

Foaming Pitch Preparation:

The system to prepare the foaming pitch is the similar to systems used to prepare the green coke. The major differences are that the pitch was heated to temperatures lower than the point of producing green coke. At these temperatures the pitch partially devolatilizes while retaining several characteristics of pitch. That is, the foaming pitch possesses a high enough volatile content where the material is fluid enough at elevated temperatures to fuse the carbon particles into carbon foam.

A second major difference in the foaming pitch preparation compared to similar, convention procedures is that the system is operated at a slight vacuum (about 700 torr). The slight vacuum increased the efficiency of removal of volatiles at the lower temperatures used. Moreover, the slight vacuum also provided for capture of the volatiles escaping from the pitch to a vapor collection system. Therefore, the volatiles did not condense and reflux when contacting the unheated surface of the coking vessel lid.

After the pitch was produced, it was placed into a storage container, then it was placed at about −5° C. for about 12 hours. At this lower temperature, the pitch is brittle and can easily be removed from the storage container. The pitch was removed from the storage container (e.g., in the studies described herein, it was removed using a hammer and paint scraper). The pitch was then weighed for assessment of mass balance, and then transferred into a customized coking vessel by pouring it into the top open flange. The lid gasket of the coking vessel was inspected and replaced if needed. The lid for the coking vessel was then bolted into place and the vessel properly insulated using high temperature insulation. The coking vessel, held in the portable stand, was then moved into place and connected to the volatile recovery section of the system. It was also connected to the nitrogen feed and the power source.

Once the coking vessel was in place and connected to the nitrogen feed and the power source, the nitrogen purge was turned on at a flow 20 psi. Without wishing to be bound by a particular theory, it is believe that the nitrogen flow serves two purposes. First, the nitrogen flow enables creating an inert environment within the coking vessel. Second, the nitrogen flow facilitates escape of the volatiles to the condensation and recovery portion of the coking system. The temperature of the vessel was heated from room temperature to 500° C. as rapidly as possible. In the studies described herein, it took about 3 hours heating time in order to reach 500° C. from room temperature. The temperature was then maintained for an additional six hours as the pitch continued to devolatilize. The coker and contents were then allowed to cool for 12 hours.

Once cooled, the coking vessel was disconnected from the power supply, nitrogen source, and volatile recovery portion of the system. The vessel was then moved from processing areas to remove the foaming pitch. The insulation from the coking vessel was removed from the top and bottom flanges. The top and bottom flanges were then unbolted and removed. A chrome plated steel plunger slightly less in the inside diameter the coking vessel was then used to push the foaming pitch out of the vessel and into the collection container below. The foaming pitch was then weighed, inspected, and a sample taken for analysis.

After inspection, the foaming pitch was further devolatilized by loading it back into the coking vessel for a second heat treatment and heating to 525° C. where it was held for eight hours at temperature. This procedure follows the exact same procedure described above in the section.

Grinding and Sizing the Foaming Pitch:

Average particle size and particle size range are important variable in producing foams of different quality and consistency. The particle size was also related to the level of volatile material in the foaming pitch, which can be controlled by the partial coking process described in the previous section. These are the two main operating conditions and variables that govern the quality and consistency of the carbon foam produced. The final factor was the quality of the pitch produced by the carbon conversion process.

After removing the foaming pitch from the coking vessel, the pieces ranged in size from roughly about 0.5 cm to about 8 cm. The larger pieces were crushed with a hand-operated rock crusher comprising a 3-inch diameter steel tube with a baseplate and open at the top. The weighted piston was lowered into the tube to crush the material within. The smaller pieces were then placed in a mortar and pedestal and ground to the desired particle size for the experiment.

The particle size distribution for this example was determined to be 20 to 50 mesh, 50 to 100 mesh, and less than 100 mesh. A series of sieve trays was assembled to separate the particles into the desired ranges. The collection pan was on the bottom followed by the 100-mesh sieve on top of that. Then the 50-mesh sieve was placed on top followed by the 20-mesh sieve. 200 g of the foaming pitch was weighed. The pitch included an even distribution of smaller pieces (about 1 cm), medium sized pieces (about 1 cm to about 2 cm), and larger pieces (about 2.5 cm to about 8 cm). The smaller pieces were poured on top of the 20-mesh sieve tray on the previously assembled stack of trays. The large and medium pieces were placed in the rock crusher and reduced in particle size. After the pitch was crushed, it became compacted in the bottom of the rock crusher. The pitch was loosened using a quarter inch stainless steel rod and the contents also poured on to the 20-mesh sieve tray.

The lid was placed on top of the sieve tray and it was shaken by hand to separate the material into the desired particle size ranges. This action included shaking the assembled sieve tray back and forth and side the side. The assembled tray stack would then be tapped on the bench top to assist the particles through the trays. The lid of the sieve trays was then removed. The larger remaining particles were once again transferred to the rock crusher. While the smaller remaining particles on the 20-mesh sieve tray were transferred to the mortar and pedestal. The pitch was once again crushed in the rock crusher and loosened with a stainless steel rod. The contents of the rock crusher were poured on top of the 20-mesh sieve tray. The smaller particles transferred to the mortar and pedestal were ground for several minutes and the contents also dumped on top of the 20-mesh sieve tray. The smaller compacted particles on the inside of the mortar were scraped off using a stainless steel scapula.

The lid was placed on top of the assembled sieve trays which were once again shaken by hand for several minutes to separate the particles. The particles remaining on top of the 20-mesh sieve tray was once again transferred to the mortar and pedestal to grind to a finer particle size. These actions were repeated several times until the majority of the 200 g sample had passed through the 20-mesh sieve tray. As the particles became finer, it was necessary to periodically disassemble the sieve tray and tap the mesh screens as well as wiped with a rubber spatula to eliminate the blinding defect. After the majority of the foaming pitch passed through the 20-mesh sieve, there was an appreciable amount of material in each desired particle size for the required experiments.

Foaming Mixture Preparation: A 250 mL glass beaker was weighed, and to it was added 80 g of bituminous coal with particle size range of 80-100 mesh (prepared as described for Examples 1 and 2) and 20 g of the foaming pitch with a 20-50 mesh particle size range (prepared as described herein above). The contents of the beaker were mixed for several minutes. The flux agent was shaken vigorously for several minutes, and 33 g of the flux agent was removed and added to the beaker containing the coal material and the foaming pitch material. The contents of the beaker were then stirred in order to create homogenous mixture suitable for the microwave foaming experiment. As previously noted, for consistent foam production it is important that a homogenous coal/flux mixture is used. A similar procedure of mixing and kneading as described for Examples 1 and 2 was used herein. Once the foaming mixture was essentially homogenous, it was transferred into a crucible to receive the microwave radiation and begin the foaming process as described at the beginning of Example 3 above.

Figure 7:
FIG. 7 shows a representative image of a larger sample of a disclosed carbon foam prepared from low volatile bituminous coal feedstock using a disclosed process and the additional carbon materials produced remaining in the crucible using a disclosed method as described in Example 4.
Figure 8:
FIG. 8 shows a representative image of the underside of the same sample shown in FIG. 7. The image shows trace amounts of composite carbon material formed on the underside of the carbon foam that was in contact with the inner surface of the bottom of the crucible.

Example 4. Carbon Foam Production at Atmospheric Pressure Using High Volatile Bituminous Coal Example 4 describes the method of producing carbon foam from coal employing the microwave method using a high volatile bituminous coal, in contrast to the preceding examples which utilized a low volatile bituminous coal. Example 4 highlights the relationship between the volatile percent in the coal and the weight ratio of coal to flux agent. With a higher volatile percent in the coal, a lower amount of flux agent was needed to create the pseudo-liquid state necessary to fuse the particles together during the microwave radiation portion of the process. Example 4 used a coal to flux ratio of 4:1, and the flux agent comprised a high fructose corn syrup with no added carbon conversion process volatiles (see further discussion below). In addition, the particle size range used in Example 4 was 30-50 mesh which is another one of the key variables to produce a quality foam using this method. Results from Example 4 are shown in FIGS. 7 and 8. It should be noted that FIG. 8 shows a small portion on the underside of the foam on the upper left-hand of a portion of a carbon foam composite material formed during the process. Although, most of the composite carbon material flaked off the bottom of the crucible during the experiment, the results demonstate that multiple forms of the carbon material can be produced simultaneously using the disclosed processes. The samples were assessed for conductivity using a voltmeter and determined to be conductive.

It was observed that the larger particle size range used for the high volatile bituminous coal led to much more consistent mixing which required much less time and effort. This aspect may be important in scaling the process and development towards commercialization. Although the procedure followed for Example 4 is similar to that described above for Examples 1-3, there are some specific differences which are noted herein below regarding the feedstock coal preparation and foaming mixture preparation.

Coal Preparation:

The high volatile bituminous coal was received in large plastic bags roughly 60 pounds in weight. The coal was processed through a hammer mill to reduce the particle size to approximately 2 mm. However, it was not passed through the pulverizer as the low volatile bituminous coal had been processed. Therefore, the high volatile bituminous coal was ground using a mortar and pedestal to achieve the desired particle size range of 30-50 mesh for use in this example. Initially, 200 g of the approximately 2 mm coal was ground using the mortar and pedestal and separated using an assembled stack of sieve trays. The 30-50 mesh portion of the coal was separated for use in this example, as well as in Example 5 described below. The remaining coal which passed to the 50 mesh sieve tray was collected, labeled, and stored for use in future experiments.

Foaming Mixture Preparation:

Except as otherwise noted herein, the foaming mixture preparation was the same as that described for the preceding examples. Specifically, the flux agent used in this example comprised high fructose corn syrup without any added condensed volatiles recovered from the coal conversion process. In addition, the coal to flux agent ratio was reduced based on the inherent volatile percentage of the feedstock coal. This proves the concept that a higher volatile percent in the feedstock material requires less flux agent to fuse the coal particles into a carbon foam. In Example 4, 100 g of 30-50 mesh coal was added to a 250 mL beaker, and then 25 g of high fructose corn syrup was added to the beaker. The contents of the beaker were stirred for a period of time until the foaming mixture became homogenous. It was not necessary to knead the material by hand to produce a homogenous mixture. At this point, the foaming mixture was loaded into the crucible in the same manner as the previous examples.

Post-Microwave Radiation Heat Treatment to Calcination Temperatures:

After the foam was produced using microwave radiation, the crucible containing the foam was covered with a ceramic lid and placed in a nonoxidizing environment by immersing the samples in graphite chips, covering with three layers of steel wool, and covering the ceramic bowl with a ceramic tile. The ceramic bowl containing the sample was then placed in the furnace and directly heated to calcination temperatures without the additional step of the first heat treatment. The temperatures and heating rate for this one step process are as followed: (a) the furnace was heated at a rate of 400° C. per hour from room temperature to 350° C.; (b) the heating rate was reduced to 100° C. per hour until a temperature of 550° C. was attained; (c) the heating rate was then reduced to 50° C. per hour until a temperature of 700° C. was attained; (d) the temperature was held at 700° C. for one hour; (e) the heating rate was once reduced to 25° C. per hour until a temperature of 900° C. was attained; (f) the temperature was held at 900° C. for two hours; and (g) the heat to the furnace was then stoped, and the contents allowed to cool over a period of 12 hours. The calcined carbon foam was removed and weighed. The samples were assessed for conductivity using a voltmeter and determined to be conductive.

Example 5. Carbon Foam Production at Atmospheric Pressure Using High Volatile Bituminous Coal and Foaming Pitch Example 5 describes the process for producing carbon foam using the microwave radiation method with a foaming pitch as a feedstock rather than a caking coal. In contrast to Example 3, this example is comprised entirely of a foaming pitch derived from non-caking coal instead of a combination of foaming pitch and caking coal. The foaming pitch is the same foaming pitch described and used in Example 3. The results obtained in this example demonstrate that lower rank coals of lignite and sub-bituminous can be converted into a material suitable for use as a feedstock in the disclosed processes. Representative images of carbon foams obtained using the procedure of Example 5 are shown in FIG. 9 and FIG. 10.

The foaming pitch had a particle size range of 30-50 mesh, as described in Example 3. Briefly, 90 g of the foaming pitch was weighed out and transferred to a 250 mL beaker, to which 15 g of the flux agent described and Examples 1-3 was added. The contents were mixed for a period of time until the foaming mixture was homogenous. The foaming mixture was loaded into a crucible using the same procedure as described in the previous examples. The foaming pitch mixture was then converted into carbon foam using microwave radiation. The conditions of the microwave radiation were power level two for a time period of five minutes. The carbon foam, still in the crucible, was covered with the ceramic lid and prepared in a non-oxidizing environment also described in the previous examples. The foam was then heat treated and calcined in one step using the same procedure described in Example 4.

Figure 9:
FIG. 9 shows a representative image of a disclosed carbon foam prepared from foaming pitch using a disclosed method as described in Example 5. The foaming pitch was prepared as described herein. The image further shows (upper left) a layer of graphene oxide that is deposited on the inner surface of the crucible lid.
Figure 10:
FIG. 10 shows a representative image of the underside of the carbon foam shown in FIG. 9. The image shows that a disclosed carbon composite formed from distinct carbon materials fusing together on the bottom surface of the carbon foam that is in contact with the bottom interior surface of the crucible.
Figure 11:
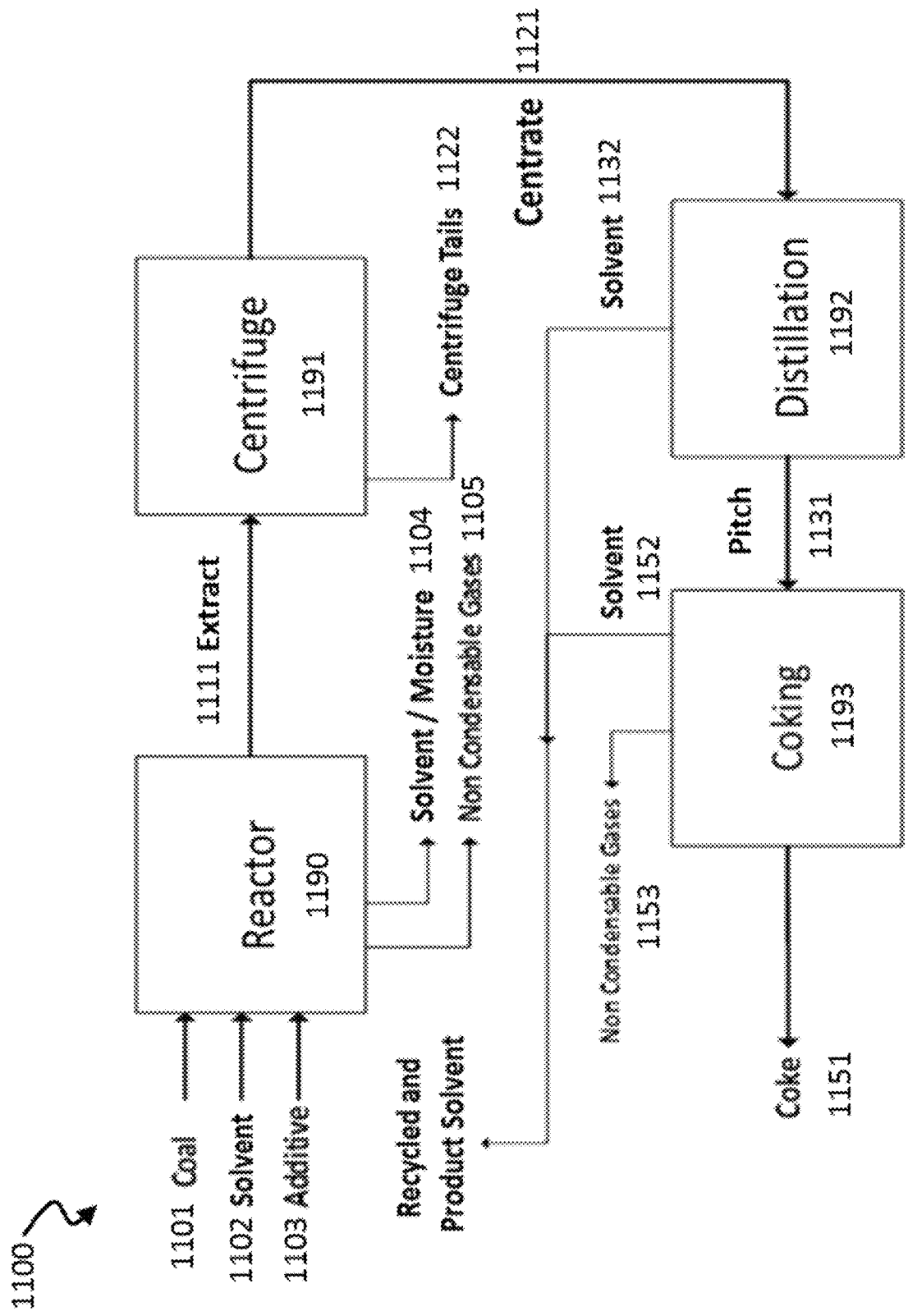
FIG. 11 shows a block flow diagram, 1100, for a representative disclosed coal conversion process.
Figure 12:
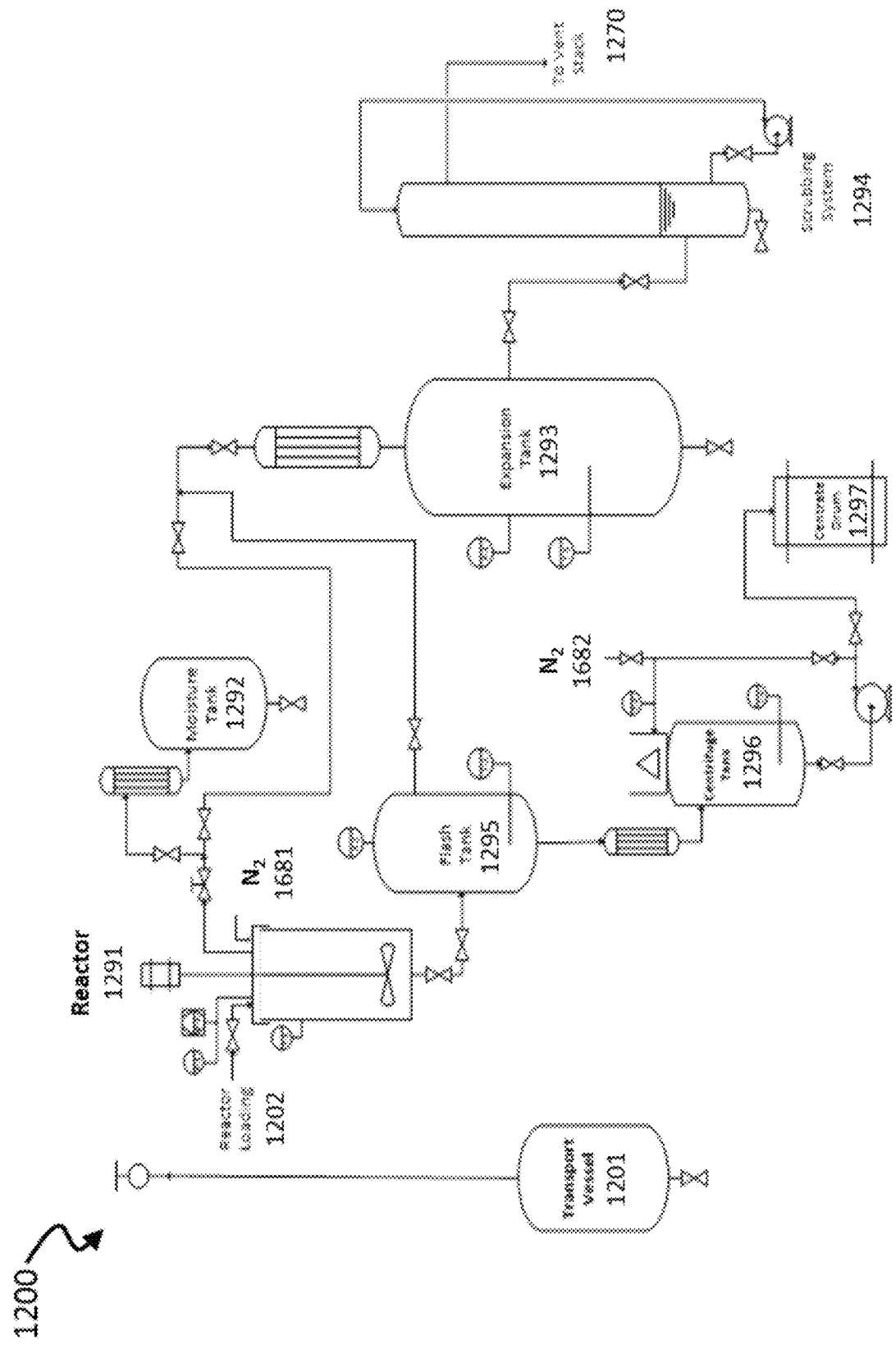
FIG. 12 shows a process flow diagram, 1600, for the reaction and ash removal steps corresponding to blocks, 1190 and 1191, of the representative disclosed coal conversion method, 1100, shown in FIG. 11.
Figure 13:
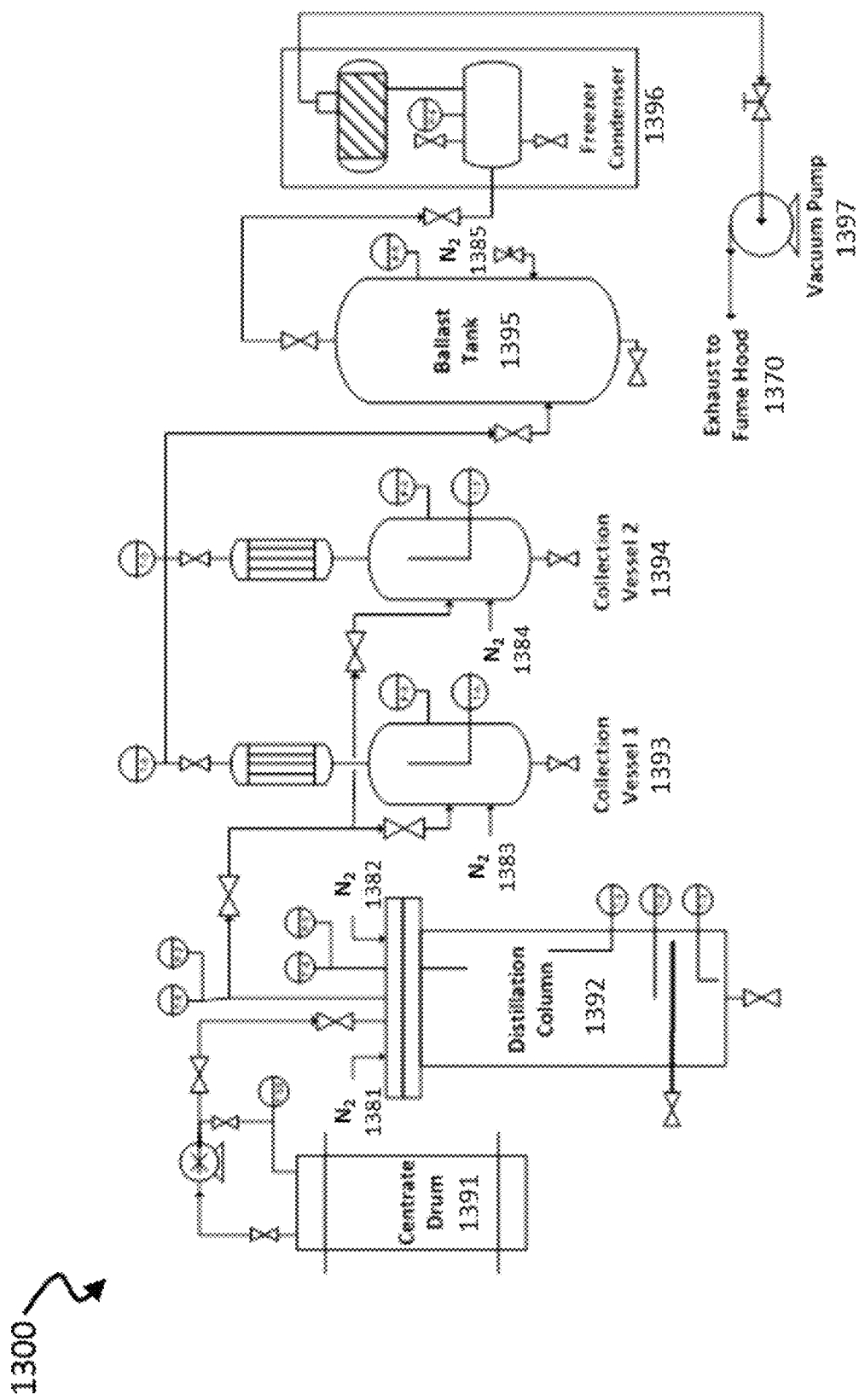
FIG. 13 shows a process flow diagram, 1300, for the distillation step corresponding to block, 1192, of the representative disclosed coal conversion method, 1100, shown in FIG. 11.
Figure 14:
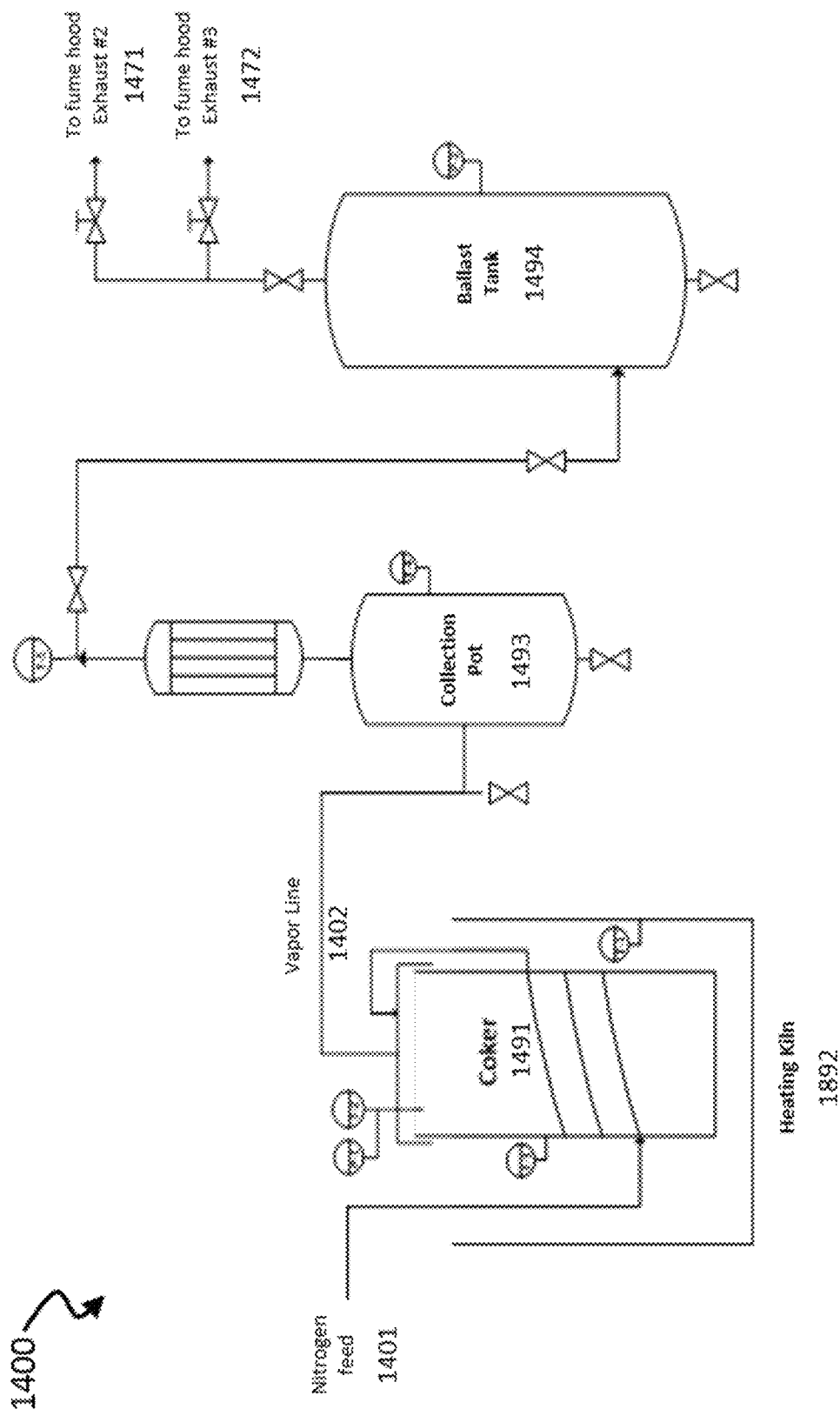
FIG. 14 shows a process flow diagram, 1400, the coking step corresponding to block, 1193, of the representative disclosed coal conversion method, 1100, shown in FIG. 11. In the process shown, during coking step, pitch is converted to foaming pitch.

The images in FIGS. 9 and 10 show a carbon foam composite material on a portion of the foam contacting the crucible and a very thin layer of graphene oxide that collected on the lid covering the crucible. These results are notable in demonstrating that the disclosed methods can produce a carbon foam, as well as secondary carbon materials that can be recovered. For example, the results in this example show that the disclosed methods can provide graphene, graphene oxide and/or a graphene-like carbon material from the vapors expelled during the heat treatment and calcination process.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A process for producing a carbon foam material, the process comprising:
   a heating step comprising heating a coal material and flux agent mixture in a microwave heating apparatus;
   wherein the coal material and flux agent mixture comprises,
      (a) a flux agent present in an amount of about 25 wt % to about 80 wt % based on the total weight of the coal material and flux agent mixture; and
      (b) a coal material present in an amount of about 20 wt % to about 75 wt % based on the total weight of the coal material and flux agent mixture; and
   wherein the flux agent is capable of absorbing microwave radiation;
   wherein the flux agent comprises one or more monosaccharide or polysaccharide; and
   wherein the coal material has a particle size range of between about 10 mesh and about 400 mesh; and
   wherein the heating step comprises:
   a first heating step comprising heating a coal material and flux agent mixture to a temperature of about 250° C. to about 500° C. at a pressure of 0.5 atm to about 1.0 atm for about 1 minute to about 60 minutes in a non-oxidizing atmosphere, thereby forming a carbon pre-foam material; and
   a second heating step comprising heating the carbon pre-foam at a temperature of greater than about 500° C. to about 750° C. at a pressure of about 0.5 atm to about 1.5 atm for about 0.5 hours to about 12 hours in a non-oxidizing atmosphere, thereby forming a carbon foam material.

2. The process of claim 1, wherein the coal material is a lignite coal material.

3. The process of claim 1, wherein the coal material is a sub-bituminous coal material.

4. The process of claim 1, wherein the coal material is a bituminous coal material.

5. The process of claim 1, wherein the flux agent comprises a primary flux agent and a secondary flux agent.

6. The process of claim 5, wherein the primary flux agent comprises a high fructose corn syrup; and wherein the secondary flux agent comprises a volatile produced in a coal conversion process; a coal tar; a product of petroleum distillation and/or cracking; or
   combinations thereof.

7. The process of claim 1, wherein the heating step is carried out at a temperature of about 450° C. to about 650° C.

8. The process of claim 1, wherein the heating step is carried out at a pressure of about 0.9 atm to about 1.1 atm.

9. The process of claim 1, wherein the non-oxidizing atmosphere comprises less than or equal to about 5% (v/v) oxygen.

10. The process of claim 1, wherein the non-oxidizing atmosphere in the first heating step comprises an inert gas; and wherein the inert gas is argon, nitrogen, or a mixture of both.

11. The process of claim 1, wherein the coal material and flux agent mixture further comprises an additional material selected from a carbon fiber, a carbon nanofiber, a carbon nanotube, a carbon flake, a carbon black, an amorphous carbon, an isotropic carbon, an anisotropic carbon, a needle coke, a graphene, a graphene oxide, a diamond particle, a diamond powder, a metallic particle, a polymer-based particle, or mixtures thereof.

12. The process of claim 1, wherein the first and second heating steps are carried out using a microwave heating apparatus.

13. The process of claim 1, wherein the second heating step is thermal heating; infrared heating; or induction heating.

14. The process of claim 1, wherein the carbon pre-foam material is a pseudo fluid material.

15. The process of claim 1, wherein the coal material has a plurality of sizes comprising a first coal material particle size and a second coal material particle size; wherein the first coal material particle size is smaller than the second coal material particle size.

16. The process of claim 1, further comprising forming a secondary carbon material.

17. The process of claim 16, wherein the secondary carbon material is a graphene, a graphene oxide, a graphite, or mixtures thereof.

18. The process of claim 17, wherein the graphene is a graphene, a graphene oxide, or mixtures thereof.

19. The process of claim 17, wherein the graphite is a graphite flake.

* * * * *